(12) United States Patent
Sugano et al.

(10) Patent No.: US 11,343,464 B2
(45) Date of Patent: May 24, 2022

(54) MEDICAL VIDEO PROCESSING SYSTEM

(71) Applicant: Medi Plus Inc., Tokyo (JP)

(72) Inventors: Naoya Sugano, Tokyo (JP); Minsu Kwon, Tokyo (JP)

(73) Assignee: MEDI PLUS INC., Tokyo (JP)

( * ) Notice: Subject to any disclaimer, the term of this patent is extended or adjusted under 35 U.S.C. 154(b) by 0 days.

(21) Appl. No.: 17/044,476

(22) PCT Filed: Mar. 11, 2019

(86) PCT No.: PCT/JP2019/009760
§ 371 (c)(1),
(2) Date: Oct. 1, 2020

(87) PCT Pub. No.: WO2019/193935
PCT Pub. Date: Oct. 10, 2019

(65) Prior Publication Data
US 2021/0144334 A1 May 13, 2021

(30) Foreign Application Priority Data
Apr. 6, 2018 (JP) .............................. JP2018-073877

(51) Int. Cl.
*H04N 5/92* (2006.01)
*G11B 27/00* (2006.01)
(Continued)

(52) U.S. Cl.
CPC ............... *H04N 5/92* (2013.01); *G11B 27/10* (2013.01); *G06F 3/14* (2013.01)

(58) Field of Classification Search
USPC .......................... 386/278, 280, 282, 286, 288
See application file for complete search history.

(56) References Cited

U.S. PATENT DOCUMENTS

2008/0019610 A1* 1/2008 Matsuzaka ........... G11B 27/034
382/284
2009/0288010 A1 11/2009 Ubillos
(Continued)

FOREIGN PATENT DOCUMENTS

CN 101958136 A 1/2011
CN 102099860 A 6/2011
(Continued)

OTHER PUBLICATIONS

International Search Report dated Apr. 9, 2019, issued in counterpart International Application No. PCT/JP2019/009760 (1 page).
(Continued)

*Primary Examiner* — Daquan Zhao
(74) *Attorney, Agent, or Firm* — Westerman, Hattori, Daniels & Adrian, LLP

(57) ABSTRACT

When one or multiple video files that correspond to at least a part of preset sections are read out from a storage unit, a length of time of a section overlap, which represents a time slot that overlaps the section among from one or more time slots over which the read video file(s) are recorded, is calculated, and the video file(s) that corresponds to the time code contained in the section overlap having been subjected to calculation are clipped and stored in a predetermined storage area, the medical video processing system can carry out, when the length of time of the section overlap (for example, 32 minutes and 10 seconds) exceeds a predetermined length of time (for example 30 minutes), a shortening process that shortens the length of time of the video file(s) to be stored in the predetermined storage area, down to a predetermined length of time or shorter.

6 Claims, 14 Drawing Sheets

(51) Int. Cl.
    *H04N 5/93*     (2006.01)
    *G11B 27/10*     (2006.01)
    *G06F 3/14*     (2006.01)

(56) References Cited

U.S. PATENT DOCUMENTS

| | | |
|---|---|---|
| 2011/0013882 A1 | 1/2011 | Kusunoki et al. |
| 2012/0039584 A1 | 2/2012 | Takagi |
| 2013/0156321 A1 | 6/2013 | Motoi et al. |
| 2014/0376887 A1* | 12/2014 | Tijssen .................. G11B 27/34 386/282 |
| 2015/0071607 A1 | 3/2015 | Goz et al. |
| 2015/0302605 A1 | 10/2015 | Sasaki et al. |
| 2017/0053543 A1 | 2/2017 | Agrawal et al. |

FOREIGN PATENT DOCUMENTS

| | | |
|---|---|---|
| JP | 2005-277702 A | 10/2005 |
| JP | 2011-36372 A | 2/2011 |
| JP | 2012-039522 A | 2/2012 |
| JP | 2015-211831 A | 11/2015 |

OTHER PUBLICATIONS

Office Action dated Apr. 9, 2021, issued in counterpart CN Application No. 201980024304 2, with English Translation. (13 pages).

\* cited by examiner

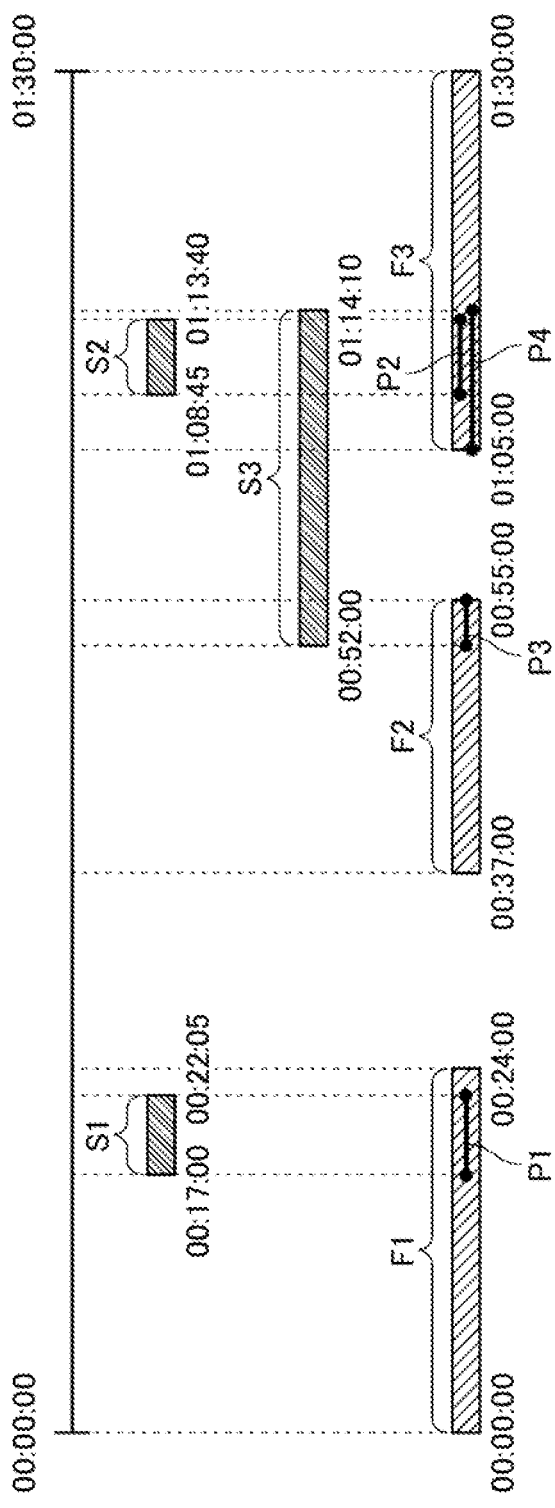
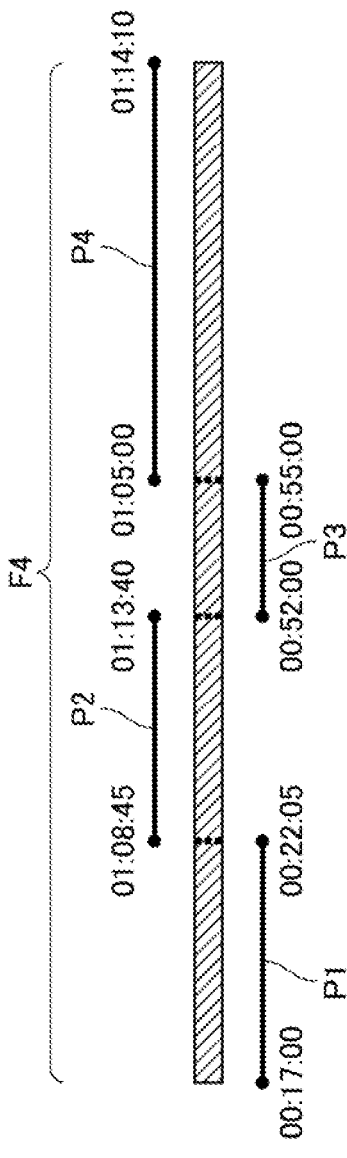
FIG.14A
FIG.14B

MEDICAL VIDEO PROCESSING SYSTEM

TECHNICAL FIELD

The present invention relates to a medical video processing system.

BACKGROUND ART

In recent years, there has been known a medical video processing system capable of shooting video using a plurality of shooting apparatuses, and of storing and managing the video in a server, for the purpose of recording details of operation in surgery.

Patent Literature 1 is exemplified as a prior invention regarding this sort of medical video processing system.

Patent Literature 1 discloses an invention intended for a case where a video that contains an image of interest (interested image) is stored and reproduced later, and aimed at enabling simple and intuitive understanding of the interested image.

CITATION LIST

Patent Literature

[Patent Literature 1] JP-A-2015-211831

SUMMARY OF THE INVENTION

Technical Problem

The invention according to Patent Literature 1 has a storage function (clipping storage) that determines a range of storage on the basis of the interested image, and partially stores video data corresponded to the thus determined range of storage, together with information for designating the interested image. The literature also discloses that, when using such storage function, the invention makes it possible to store video data corresponded to a period that extends across a referential time point corresponded to the interested image, and to modify the range of storage using a predetermined GUI (slide bar, etc.).

Most medical conference presentations allow the presenter only a limited time, so that the presenter who prepares slides for conference presentation, having embedded therein video data that represents detail of operation, often edits the length of such video data (length of time).

Considering now use of the storage function disclosed in Patent Literature 1 for clipping the video data that contains a video content (with preceding and succeeding parts of the interested image) wanted by the user, it is difficult to make the length of the video data constant, needing an additional editing workload for time adjustment, posing no advantage over the prior art. Such problem will escalate if a plurality of video data are used for preparing the presentation material.

The present invention was arrived at in consideration of the aforementioned problem, and is to provide a medical video processing system capable of relieving the user from excessive workload in editing of a medical video file.

Solution to Problem

According to the present invention, there is provided a medical video processing system that includes:

a storage unit that stores multiple video files recorded over a part of or the whole of a surgical period during which a surgery takes place, corresponding to a time code determined while assuming a certain time point in the surgical period as a start point;

a display unit that displays the video files stored in the storage unit and information regarding the video files;

a section setting unit that freely sets, upon operation made by a user, a section which is a part of or the whole of a time slot on the time code corresponded to the video files that are displayed on the display unit;

a calculation unit that reads one or multiple video files that correspond to at least a part of the section set by the section setting unit out from the storage unit, and calculates a length of time of a section overlap which represents a time slot that overlaps the section, among from one or multiple time slots over which the read video file(s) are recorded; and a clip storage unit that partially clips the video file(s) that corresponds to the time code contained in the section overlap having been subjected to calculation by the calculation unit, and stores the video file(s) in a predetermined storage area, the clip storage unit being devised, in at least a part of cases where the length of time of the section overlap calculated by the calculation unit exceeds a predetermined length of time, to carry out a shortening process that shortens the length of time of the video file(s) to be stored in the predetermined storage area, down to a predetermined length of time or shorter.

According to the present invention, the user can edit the video so as to partially clip the video file corresponded to the time code of the freely designated time slot (section) in the video file, while visually confirming the video file on the display unit, enabling the user to exactly clip a desired part of the video.

In addition, with the function of shortening the video file to be stored, if the length thereof exceeds a predetermined length of time, down to such predetermined length of time or shorter, the present invention no longer needs to edit the video so as to individually adjust the length of time of each video file.

The present invention can therefore relieve the user from excessive workload in editing of medical video file.

Advantageous Effects of Invention

The present invention can successfully provide a medical video processing system capable of relieving the user from excessive workload in editing of medical video file.

BRIEF DESCRIPTION OF DRAWINGS

FIGS. 14A and 14B are a schematic drawing regarding a process for integrating the video files to be stored.

DESCRIPTION OF EMBODIMENTS

Embodiments of the present invention will be explained below referring to the attached drawings. Note that all similar constituents in all drawings will be given same reference signs, so as to suitably avoid redundant explanation.

<Constituents Contained in Medical Video Processing System 100>

Figure 1:
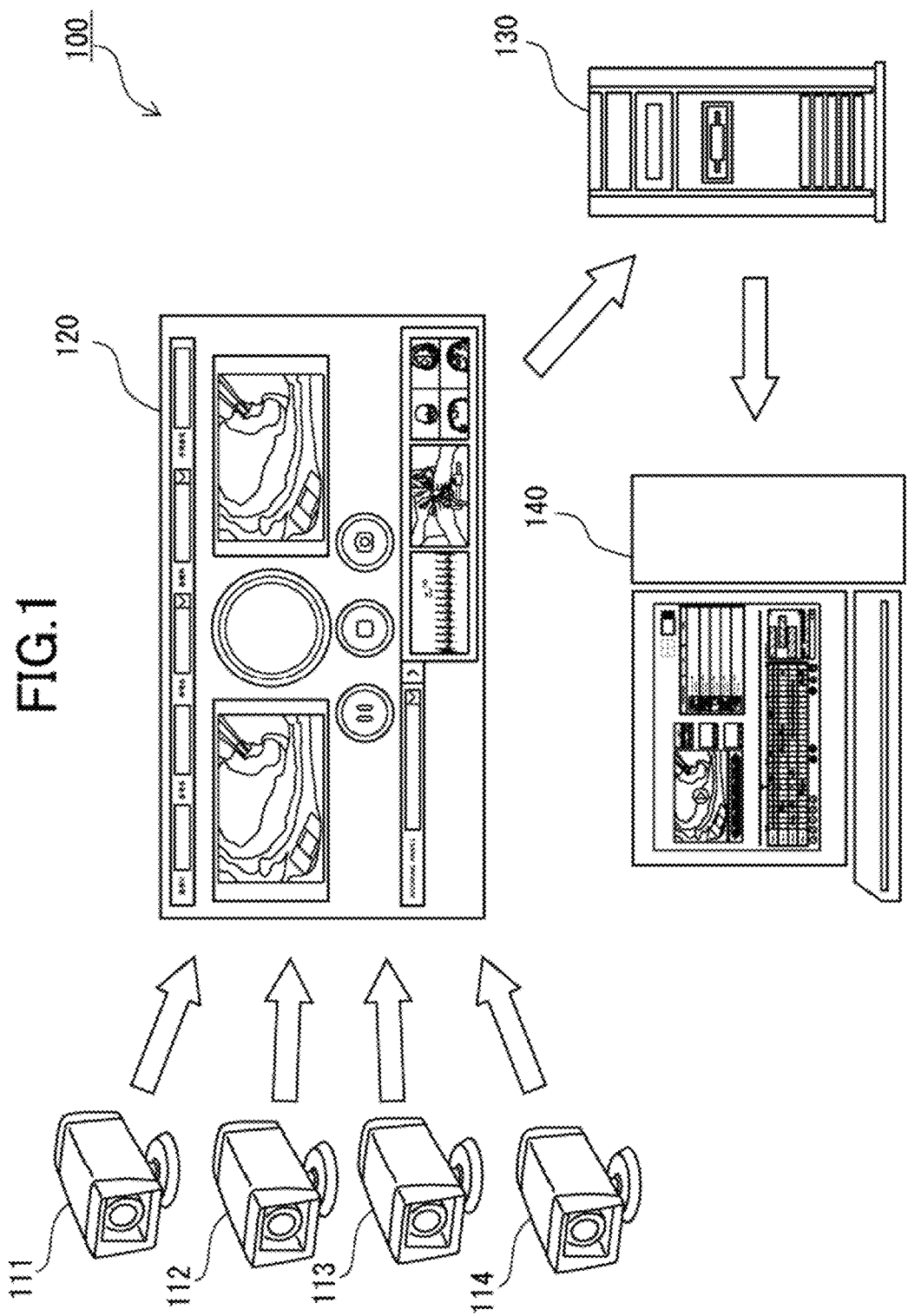
FIG. 1 is a drawing illustrating a medical video processing system of this embodiment.

FIG. 1 is a drawing illustrating a medical video processing system of this embodiment (referred to as a medical video processing system 100, hereinafter).

Arrows illustrated in FIG. 1 represent sources and destinations of video files transferred between the individual constituents. Transfer of information and data other than video file does not always necessarily coincide with indication of each arrow.

The video file in the context of explanation below may be any of those composed solely of image data, or may be any of those containing image data and audio data.

The medical video processing system 100 has a plurality of recording devices (cameras 111 to 114), an encoder 120, a server device 130, and a viewing terminal device 140.

The cameras 111 to 114 are recording devices that shoot a surgical subject (patient) being operated and the peripherals, and produce video files.

For example, the cameras 111 and 113 are used for shooting a surgical field, where the camera 113 covers a wider field as compared with the camera 111. The camera 112 shoots a heartrate monitor, the camera 114 shoots a monitor displaying an image of magnetic resonance imaging (MRI) or the like. The cameras 112 and 114 are commonly intended for shooting a biological information monitor that displays biological information regarding the surgical subject being operated.

Note that the aforementioned number of the cameras 111 to 114 and the subject to be shot are merely illustrative, without limiting the embodiments of the present invention.

The encoder 120 performs encoding (encodes) the video files produced by the cameras 111 to 114, so as to convert the mode suitable for transfer to the server device 130 and for storage therein.

The encoder 120 preferably compresses the video files and stores them in the server device 130, because this successfully reduces volume of the video files to be stored in the server device 130.

The encoder 120 takes part in control over shooting with the cameras 111 to 114, upon operation made by an user, and inputs a plurality of surgery-related video files produced by the shooting, by sorting them to each of the plurality of input systems (for each of the cameras 111 to 114). That is, the encoder 120 composes a video input unit in the context of the present invention.

Now the "control over shooting with the cameras 111 to 114" in this embodiment means making the cameras 111 to 114 perform start of recording video, pause of recording, stop of recording, and shooting of still image.

Note that aforementioned items of the control over shooting with the cameras 111 to 114 are merely illustrative, without limiting the embodiments of the present invention. The encoder 120 is not more than having a plurality of input systems, so that it is not always necessary in the embodiment of the present invention to input the video files through all of the input systems. Hence, the number of video files to be input by the encoder 120 will decrease depending on the number of working recording devices, consequently allowing a case where only one video file is input.

The server device 130 stores the video files transferred from the encoder 120. In more detail, the server device 130 stores a plurality of video files recorded over a part of or the whole of a surgical period, corresponding to a time code determined while assuming, as the start point, a certain time point in the surgical period during which surgery takes place. Hence, the server device 130 composes the storage unit in the context of the present invention.

Now, the time code means time-series information (information regarding sequential order of frames composing the video file) corresponded to the video file, and is preferably assigned to every frame. The start point of the time code may be freely determined by the user (a surgeon or an assistant, for example) of the encoder 120 within a period over which the surgery takes place, or may be determined so as to be triggered by a signal that indicates the start point of surgery, entered through an external device (not illustrated).

The viewing terminal device 140 is a computer equipment having installed thereon an application software used for playback and editing of the video files stored in the server device 130.

The viewing terminal device 140 can accesses the video files stored in the server device 130, can display one or a plurality of video files corresponded to a common time code, and can also display information regarding the video files being displayed. That is, the viewing terminal device 140 composes the display unit in the context of the present invention.

The viewing terminal device 140 can also accept operational input made thereon by the user, and can execute various processes on the basis of the operational input thus accepted.

Note in the explanation below, "display of video file" and "playback of video file" are used almost synonymously, without special discrimination.

A plurality of viewing terminal devices 140, although being illustrated in FIG. 1 as a single body, may be provided to the medical video processing system 100. Moreover, the application software installed on the viewing terminal device 140 is not always necessarily embodied by application software specialized for the present invention, but may alternatively be embodied by general-purpose application software (internet browser, for example), or any software having been improved or modified.

The server device 130 can take part in editing regarding the video file being displayed in a display area of the viewing terminal device 140, on the basis of the operational input accepted by the viewing terminal device 140.

The server device 130 that takes part in editing is embodied as a device independent of the viewing terminal device 140 (a display unit and an operational input unit). If the viewing terminal device 140 were devised to enable thereon editing, such editing has to come after completion of transfer of the video files to be edited from the server device 130 to the viewing terminal device 140. Such system configuration, however, makes it difficult to ensure a sufficient level of safety regarding management of the video files in the medical video processing system 100 (server device 130), and would even result in inadequate leakage of video files.

Since the medical video files are highly confidential personal information, so that the medical video processing system 100 of this embodiment employs the aforementioned configuration, in order to avoid external leakage of the video files.

<Operations on Encoder 120>

Next, operations on the encoder 120 will be explained referring to FIGS. 2 to 4.

Figure 2:
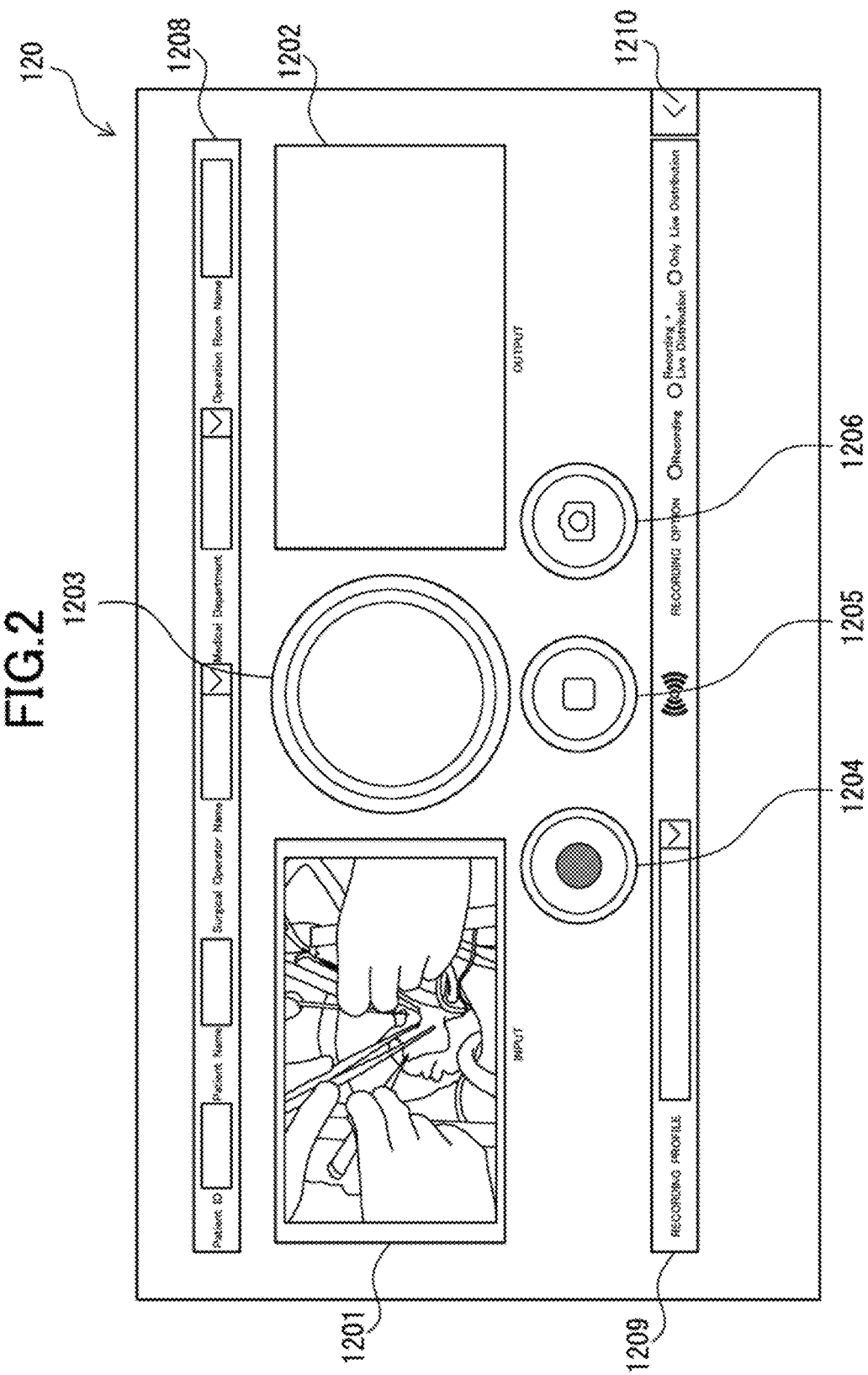
FIG. 2 is a drawing illustrating a specific example of a screen displayed in a display area of an encoder.
Figure 3:
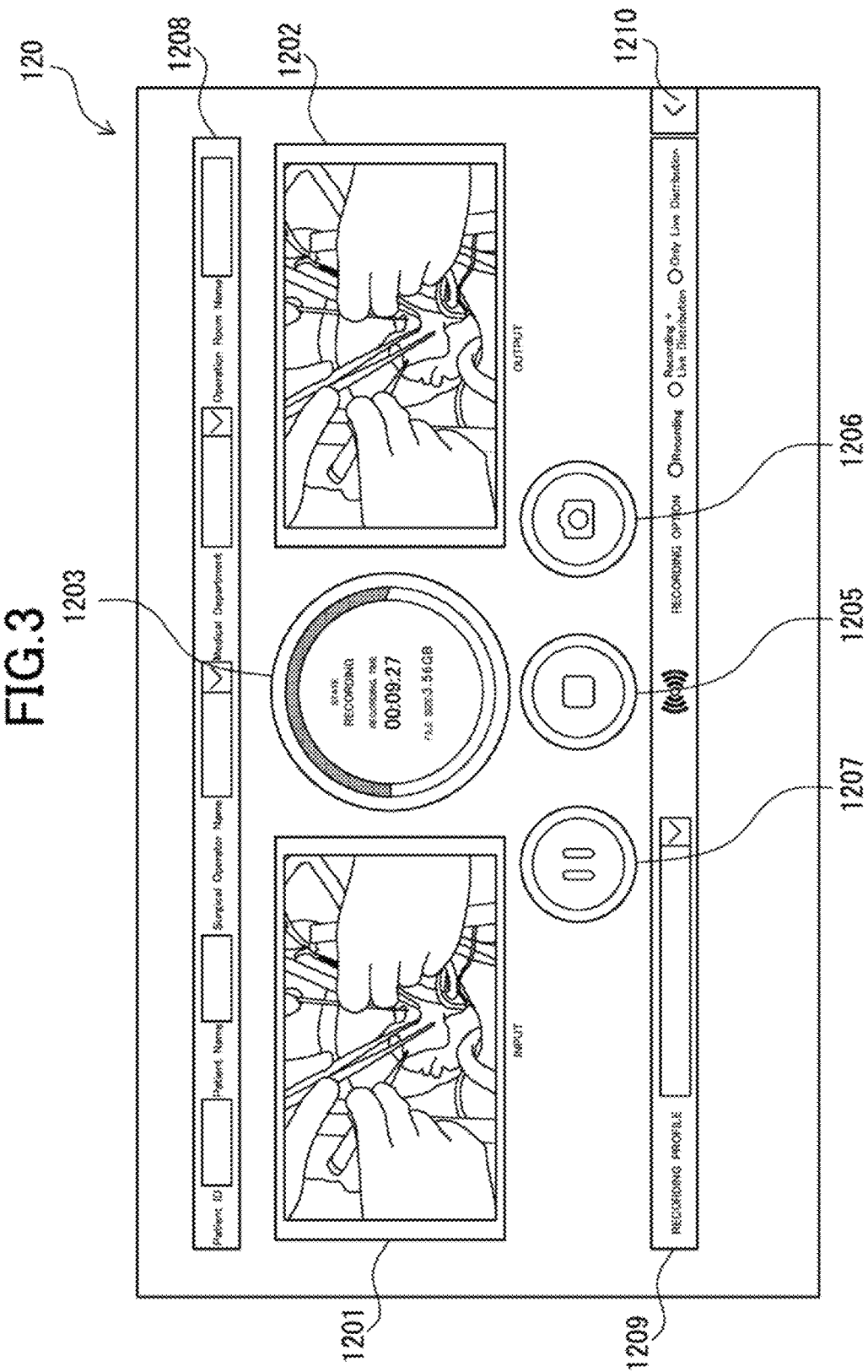
FIG. 3 is a drawing illustrating a specific example of a screen displayed in the display area of the encoder.
Figure 4:
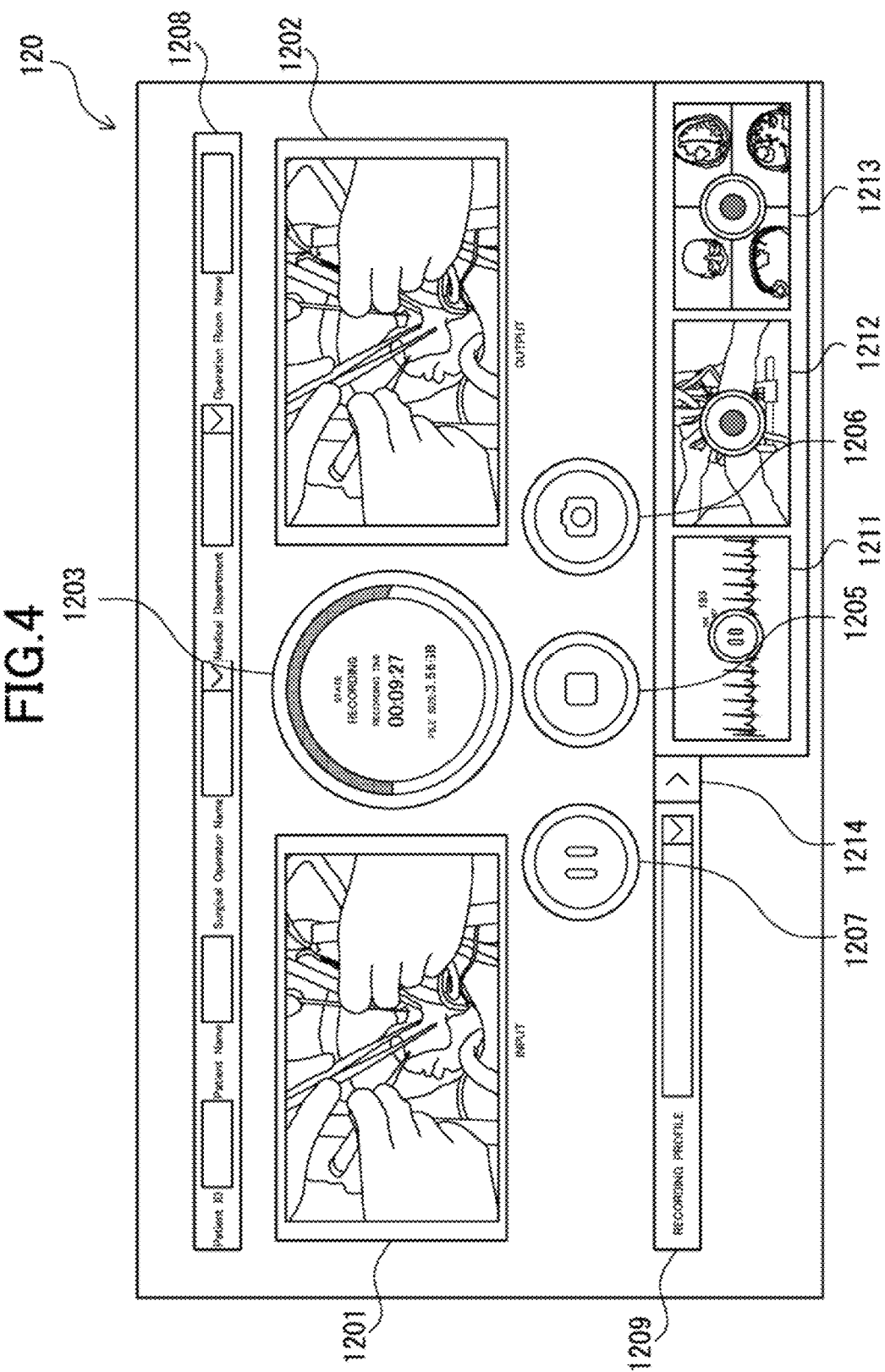
FIG. 4 is a drawing illustrating a specific example of a screen displayed in the display area of the encoder.

FIGS. 2 to 4 are drawings illustrating specific examples of screen displayed in the display area of the encoder 120. FIG. 2 is a drawing illustrating the display area of the encoder 120 before recording. FIG. 3 is a drawing illustrating the display area of the encoder 120 during recording. FIG. 4 is a drawing illustrating the display area of the encoder 120 having extension screens displayed thereon during recording.

The display area of the encoder 120 serves as a graphical user interface (GUI), so that the user can operate the encoder 120 by operating icons on the display, using an unillustrated input device (mouse, keyboard, etc.) attached to the encoder 120. The display area of the encoder 120, when given in the form of touch panel, can function by itself as an input device.

The display area of the encoder 120 will have displayed therein an input screen 1201, an output screen 1202, and a status indicator 1203.

The input screen 1201 is a screen on which any of the video files input from the cameras 111 to 114 is played back. For example, FIGS. 2 to 4 illustrate an exemplary state that the video file input from the camera 111 is played back on the input screen 1201.

The output screen 1202 is a screen on which the video files output from the encoder 120 to the server device 130 is played back. There are three types of output mode from the encoder 120, which include recording mode (output mode making the server device 130 store the input video files); live mode (output mode enabling live streaming of the input video files to the viewing terminal device 140); and combination of the recording mode and the live mode. Note that the display area of the encoder 120 illustrated in FIGS. 3 and 4 represents a case where the encoder 120 outputs the video file according to the recording mode.

The status indicator 1203 indicates a state of the video file currently played back at that time on the output screen 1202, that is, the video file being output to the server device 130. More specifically, the status indicator 1203 indicates the mode with which the video files are output, output duration, data volume of the output video files, and so forth.

The display area of the encoder 120 has presented therein a recording start button 1204, a recording stop button 1205, a still image shoot button 1206, and a recording pause button 1207.

The recording start button 1204 is a button through which an operation that triggers recording (storing into the server device 130) of the video file currently played back on the input screen 1201 is accepted.

The recording stop button 1205 is a button through which an operation that triggers stop of recording (storing into the server device 130) of the video file is accepted.

The still image shoot button 1206 is a button through which an operation that triggers storage of one frame of the video file currently played back on the input screen 1201, as a still image into the server device 130.

The recording pause button 1207 is a button through which an operation that triggers pause of recording (storing into the server device 130) of the video file, or that triggers cancellation of pause is accepted.

Note that the recording start button 1204 does not appear during a period of recording of the video file (including a pause period of recording), meanwhile the recording pause button 1207 does not appear during a period the video file is not recorded. Hence, any operation made on the recording start button 1204 during the non-recording period will substitute the recording start button 1204 with the recording pause button 1207, meanwhile any operation made on the recording stop button 1205 during the recording period will substitute the recording pause button 1207 with the recording start button 1204.

The display area of the encoder 120 has presented therein a surgical information indicator 1208 and an output information indicator 1209.

The surgical information indicator 1208 shows surgery-related information regarding video file currently played back on the input screen 120, which is more specifically an identification number and name of a surgical subject (patient), name of a surgeon, name of a medical department, name of place where surgery takes place, and so forth. The name of surgeon and the name of medical department are selectable by an operational input by the user made on the surgical information indicator 1208. Among from the information given in the surgical information indicator 1208, those needing no operational input by the user may be imported from an unillustrated external system (for example, electronic medical record system).

The output information indicator 1209 shows a file format of the video file currently played back on the output screen 1202, presence or absence of audio output together with the video file, and an output mode to the server device 130. Note that the aforementioned information given in the output information indicator 1209 is selectable by an operational input by the user made on the output information indicator 1209.

The display area of the encoder 120 has presented therein a display extension ON button 1210 and a display extension OFF button 1214.

The display extension ON button 1210 is a button through which an operation that triggers turning ON of the extension display area, in which a video file input from an input system other than that outputting the video file currently played back on the input screen 1201 or on the output screen 1202, is accepted. For example, FIG. 4 illustrates a mode where a video file input from the camera 112 is displayed on a sub-screen 1211 in the extension display area, a video file input from the camera 113 is displayed on a sub-screen 1212, and a video file input from the camera 114 is displayed on a sub-screen 1213. When recording of the video file to be played back on the extension display area is in process in this mode, an icon similar to the recording pause button 1207 is overlaid on the video file, wherein operation made on the icon results in pause of recording. Meanwhile when recording of the video file to be played back on the extension display area is not in process in this mode, an icon similar to the recording start button 1204 is overlaid on the video file, wherein operation made on the icon results in start of recording.

The display extension OFF button 1214 is a button that appears when the extension display area is displayed, through which an operation that triggers turning OFF of the extension display area is accepted.

<Synchronous Display on Viewing Terminal Device 140>

Next, synchronous display on the viewing terminal device 140 will be explained, referring to FIGS. 5 to 12.

Figure 5:
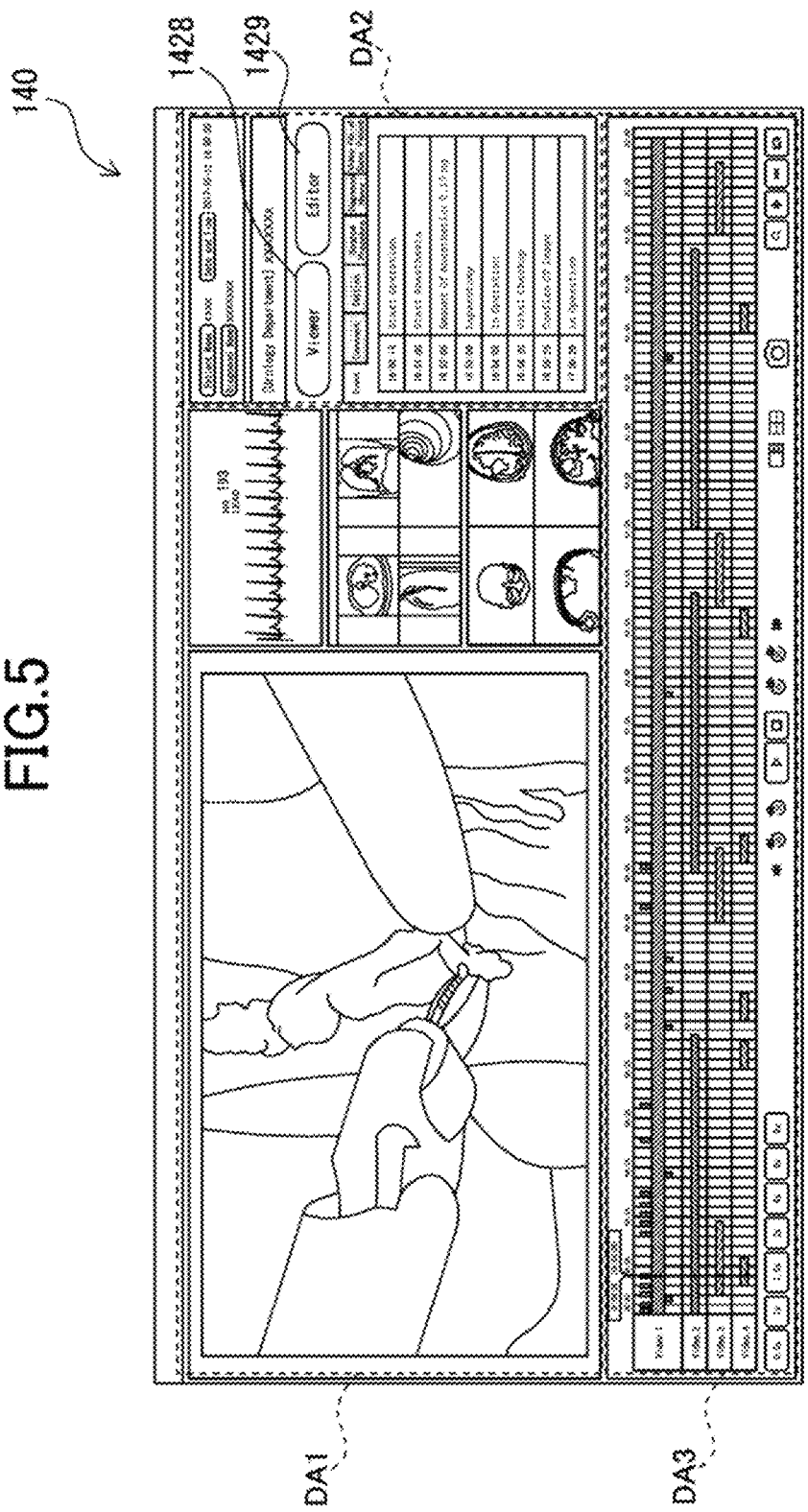
FIG. 5 is a drawing illustrating, a specific example of a screen displayed in a display area of a viewing terminal device.
Figure 6:
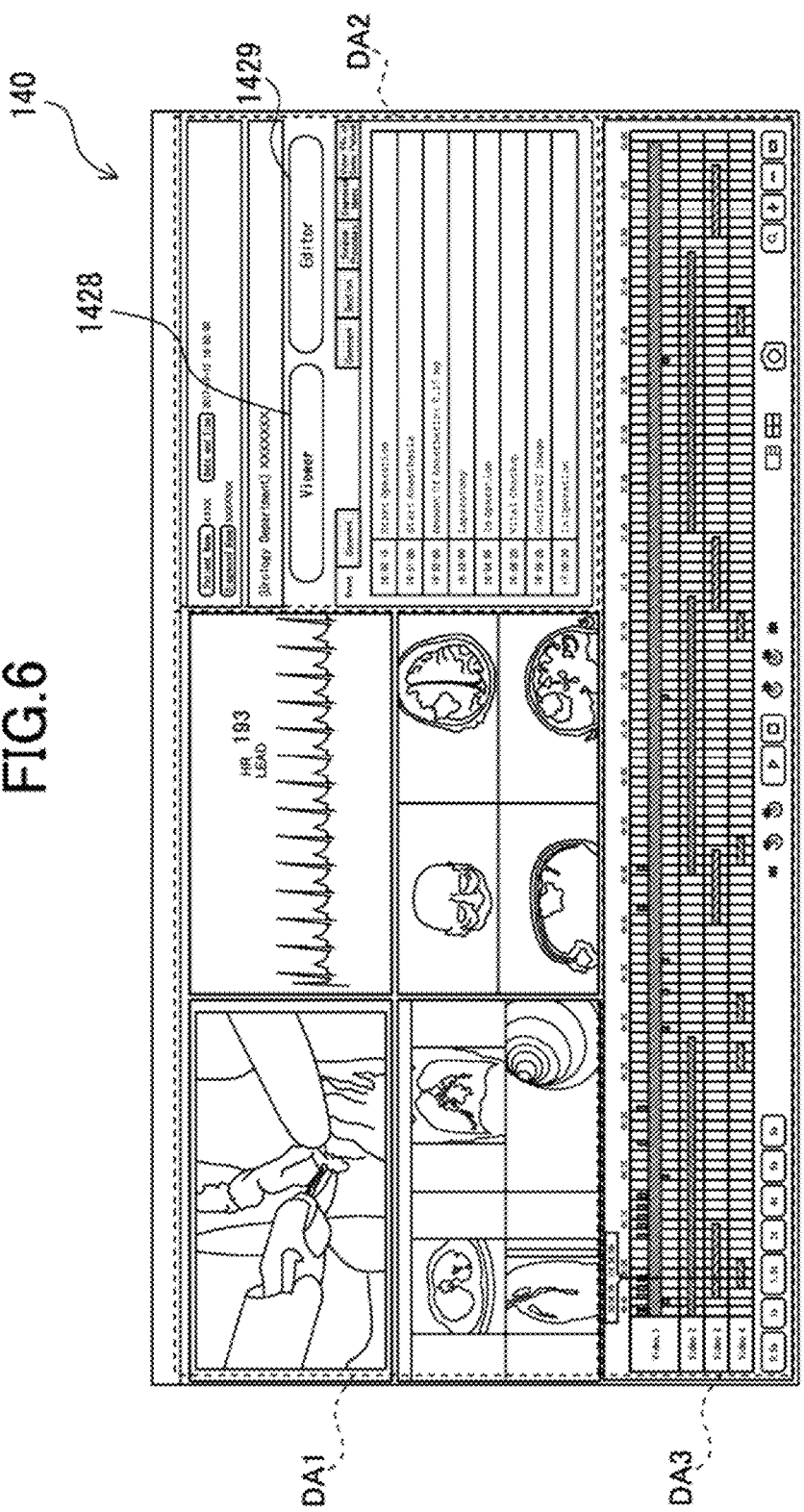
FIG. 6 is a drawing illustrating a specific example of a screen displayed in the display area of the viewing terminal device.
Figure 7:
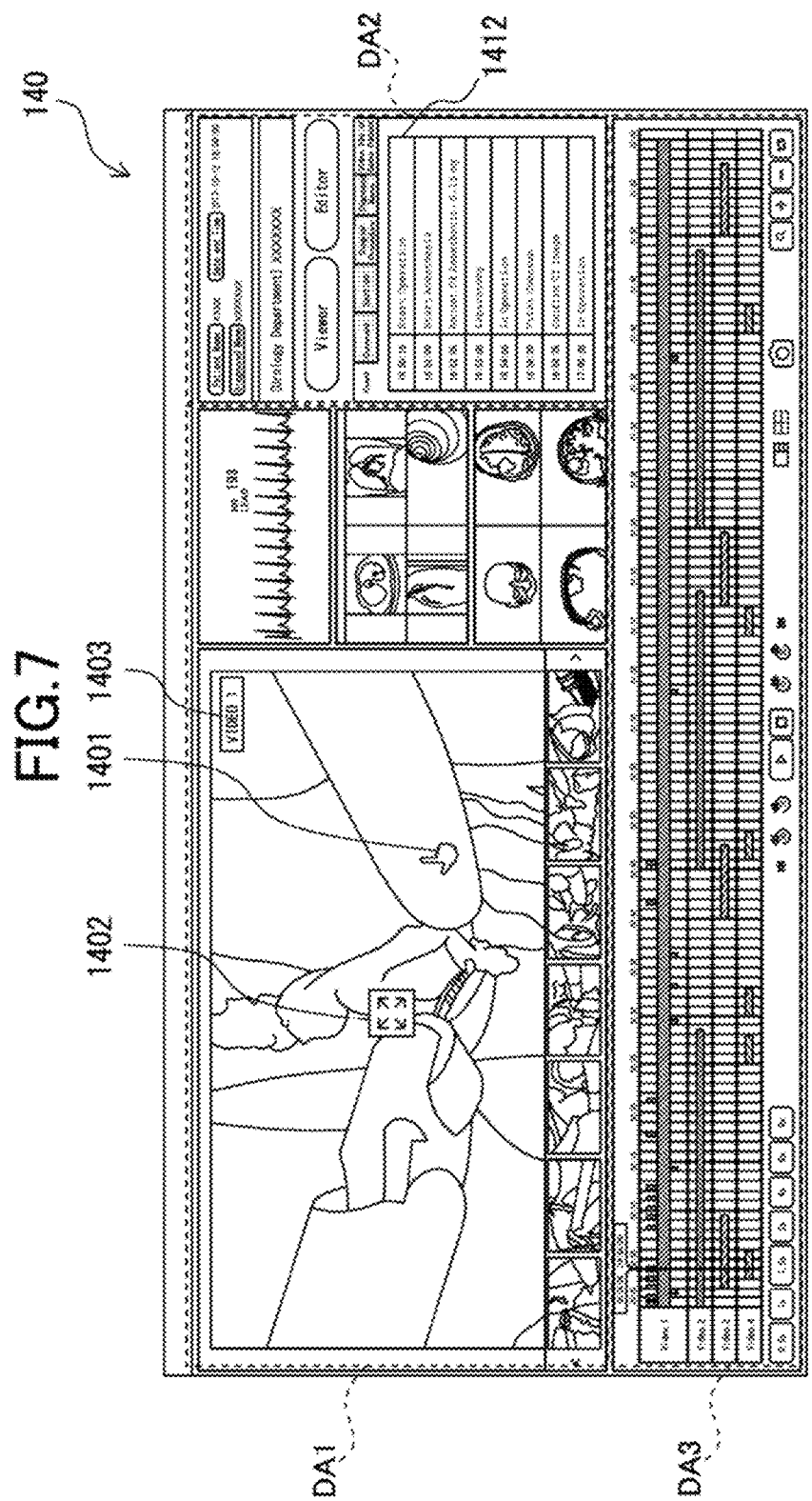
FIG. 7 is a drawing illustrating a specific example of a screen displayed in the display area of the viewing terminal device.
Figure 8:
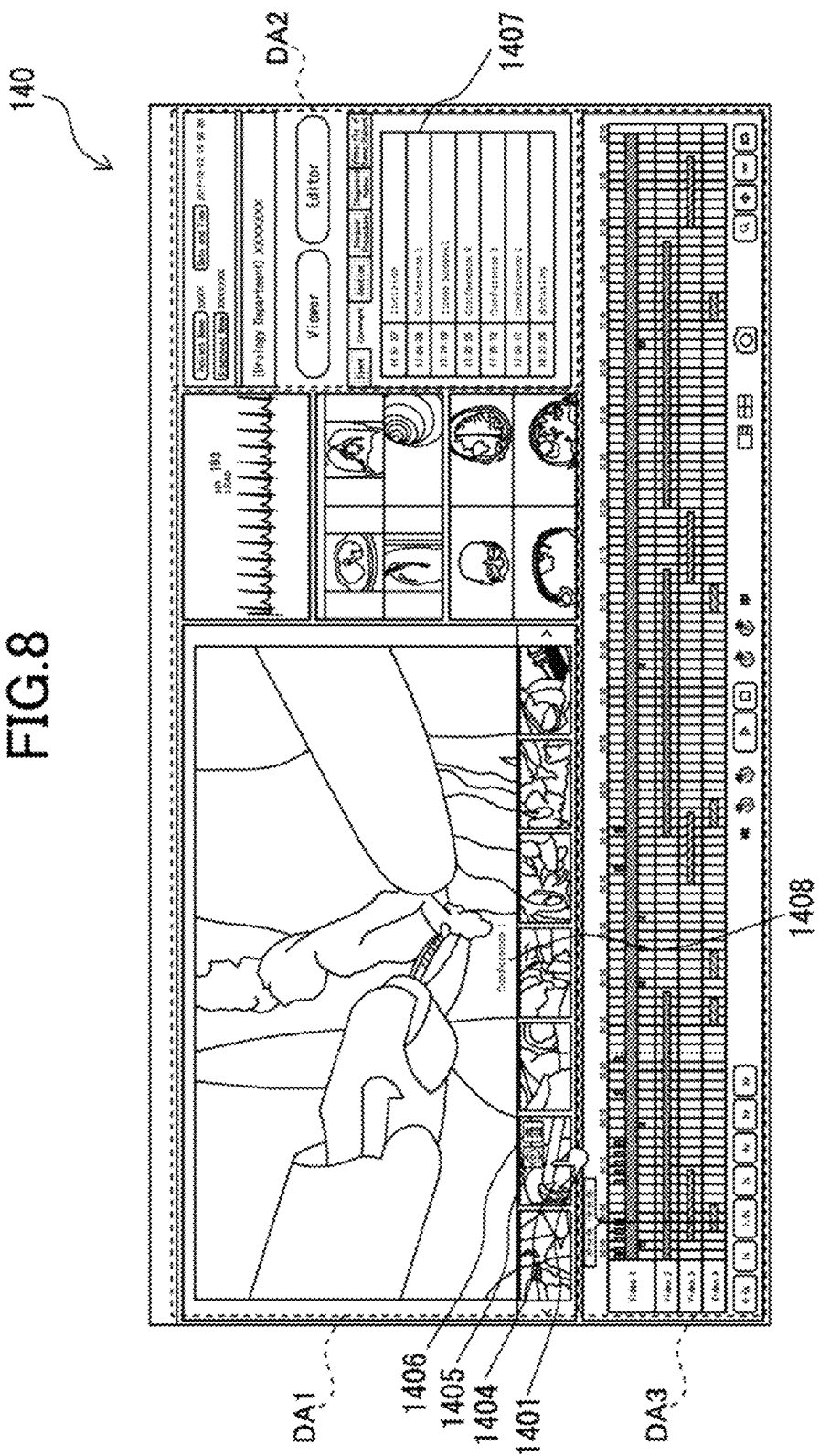
FIG. 8 is a drawing illustrating a specific example of a screen displayed in the display area of the viewing terminal device.
Figure 9:
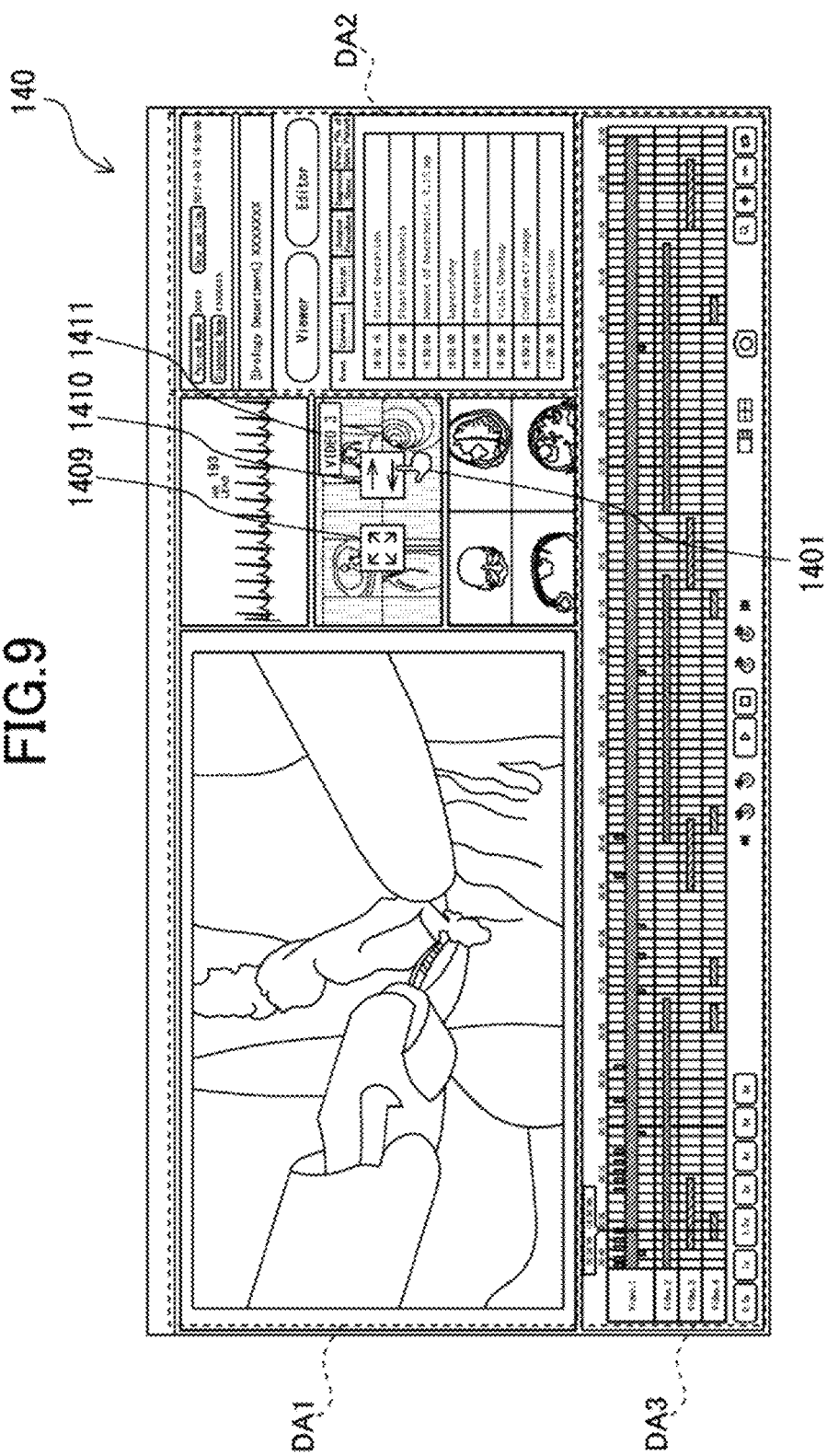
FIG. 9 is a drawing illustrating a specific example of a screen displayed in the display area of the viewing terminal device.

FIGS. 5 to 9 are drawings illustrating specific examples of screens that appear in the display area of the viewing terminal device 140. In more detail, FIG. 5 is a drawing illustrating a display mode in which, in a synchronous display area DA1, one video file is played back on a main screen, and other video files are played back on sub-screens. FIG. 6 is a drawing illustrating a display mode in which the synchronous display area DA1 is divided into four sections in which four video files area independently played back. FIG. 7 is a drawing illustrating a mode in which a cursor is placed on the main screen in the synchronous display area DA1. FIG. 8 is a drawing illustrating a mode in which the cursor is placed on a still image displayed below the main screen in the synchronous display area DA1. FIG. 9 is a drawing illustrating a mode in which the cursor is placed on a sub-screen in the synchronous display area DA1.

Figure 10:
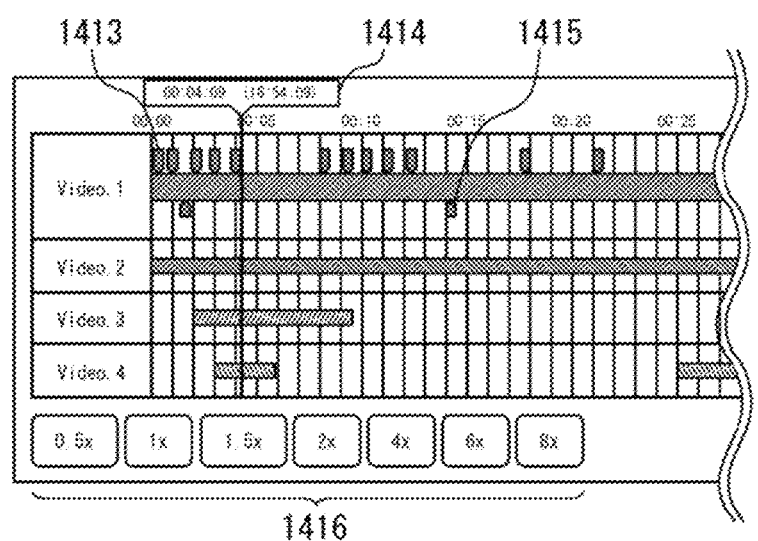
FIG. 10 is an enlarged view illustrating a magnification of a part of a timeline display area.
Figure 11:
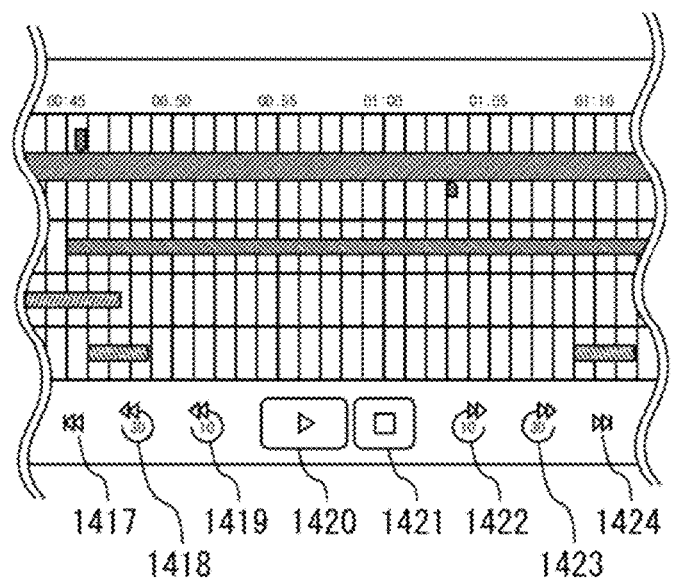
FIG. 11 is an enlarged view illustrating a magnification of a part of a timeline display area.
Figure 12:
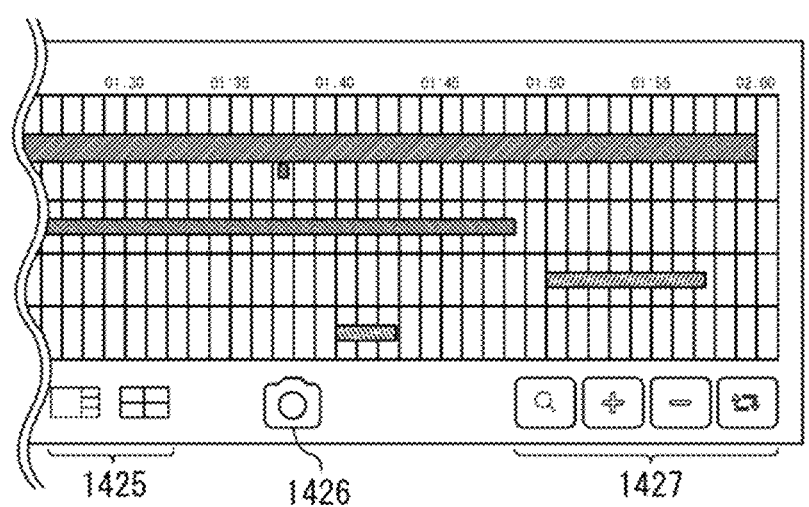
FIG. 12 is an enlarged view illustrating a magnification of a part of a timeline display area.

FIGS. 10 to 12 are enlarged views illustrating magnifications of parts of a timeline display area DA3. In more detail, FIG. 10 is an enlarged view illustrating a magnification of a left part of the timeline display area DA3. FIG. 11 is an enlarged view illustrating a magnification of a center part of the timeline display area DA3. FIG. 12 is an enlarged view illustrating a magnification of a right part of the timeline display area DA3.

The display area of the viewing terminal device 140 serves as a graphical user interface, so that the user can operate the viewing terminal device 140 by operating icons on the display, using an unillustrated input device attached to the viewing terminal device 140. The display area of the viewing terminal device 140, when given in the form of touch panel, can function by itself as an input device.

In the explanation below, the cursor that points a target to be operated through the input device will be referred to as a pointer 1401.

The display area of the viewing terminal device 140 contains the synchronous display area DA1, a supplementary display area DA2, and the timeline display area DA3.

Note that areas surrounded by broken lines in FIGS. 5 to 9 merely represent ranges of the aforementioned display areas, and are not actually presented in the display area of the viewing terminal device 140.

The synchronous display area DA1 synchronously displays a plurality of images corresponded to the time code at a certain time point contained in the timeline given in the timeline display area DA3, among from the images contained in a plurality of video files corresponded to the timeline given in the timeline display area DA3.

In a typical case where the left icon in the division mode select area 1425 (see FIG. 12) is selected by an operational input by the user, the synchronous display area DA1 displays a video file input from the camera 111 on the main screen, and displays the video files input from the cameras 112 to 114 on the sub-screens (see FIG. 5).

Alternatively, when the right icon in the division mode select area 1425 is selected by an operational input by the user, the synchronous display area DA1 displays four video files input from the cameras 111 to 114 in the display area in an equally quartered manner (see FIG. 6).

In the synchronous display area DA1, a trial of synchronous playback of a plurality of video files will cause a time lag in the loading time among the individual video files at the start or playback thereof, due to difference of bit rates among the individual videos. Moreover, the magnitude of difference of the loading time will not be constant, since it is typically affected by process capacities of the server device 130, the viewing terminal device 140 and a network line (not illustrated) that connects them. The viewing terminal device 140 then communicates with a video file playback function (referred to as video player, hereinafter) in each screen to adjust buffer time, in order to solve the aforementioned problem.

In an exemplary case where the video file is played back on one screen (main screen, for example), the viewing terminal device 140 initially loads only a 5 second-long part from the top of the video file, rather than loading the whole data thereof, and then loads during playback thereof the next 5-second-long part. The viewing terminal device 140 can thus provide a seamless playback by sequentially repeating the aforementioned processes.

Making use of such time during which data corresponded to a predetermined length of time is buffered, synchronous start of playback on one screen (main screen, for example) and other screens (sub-screens, for example) may be enabled in such a way that the video player for the main screen, upon completion of loading of a 5-second-long data of a video file, posts the completion to the video players for the sub-screens, using such post to trigger playback on both screens.

Note that such post may be made not only in such case where a plurality of video players start playback at the same time, but also in a case where, during playback of a video file on one video player, playback of other video file on other video player starts; or in a case where, during playback of video files on a plurality of video players, playback of video files on a part of the video players interrupts (comes into unrecorded time slot).

The supplementary display area DA2 may have contents displayed in the display area thereof, which are selectively switchable by pointing, with the pointer 1401, a viewer switching icon (Viewer) 1428 and an editor switching icon (Editor) 1429 given in the display area.

When pointed on the viewer switching icon 1428, the supplementary display area DA2 acquires information regarding the video file being displayed on the synchronous display area DA1 from the server device 130 or other unillustrated device (or system), and selectively display it.

In an exemplary case where an "Event" tab is selected in the supplementary display area DA2 (a mode illustrated in FIG. 5, etc.), the supplementary display area DA2 will present surgery-related event information input from an unillustrated external system that manages anesthesia administration (start of surgery, start of anesthesia administration, etc.), and temporal information regarding such event information.

Alternatively in an exemplary case where an "Comment" tab is selected in the supplementary display area DA2 (a mode illustrated in FIG. 8), the supplementary display area DA2 will present time (time code) corresponded to a still image captured by a capturing process described later, and a comment regarding such still image posted by the user.

Again alternatively in an exemplary case where a "Surgical Method" tab is selected in the supplementary display area DA2 (not illustrated), the supplementary display area DA2 will present a video file, having been stored in the server device 130, while being correlated with the same surgical method with the video file being synchronously displayed in the synchronous display area DA1, together with information regarding the video file.

Again alternatively in an exemplary case where "Diagnosis" tab is selected in the supplementary display area DA2 (not illustrated), the supplementary display area DA2 will present a video file, having been stored in the server device 130 while being correlated with the same diagnosis with the video file currently played back in the synchronous display area DA1, together with information regarding the video file.

Again alternatively in an exemplary case where "Video of Same Patient" tab is selected in the supplementary display area DA2 (not illustrated), the supplementary display area DA2 will present a video file, having been stored in the server device 130 while being correlated with the same patient ID with the video file currently played back in the synchronous display area DA1, together with information regarding the video file.

Note that the above enumerated information displayed in the supplementary display area DA2 are merely illustrative, instead allowing any information other than those enumerated above to be displayed in the supplementary display area DA2, or allowing at least a part of the above enumerated information to be hidden. Also layouts of information displayed in the supplementary display area DA2, illustrated in the individual drawings are merely examples. The layout in the supplementary display area DA2 is not limited to the illustrated ones.

The event information and the temporal information received from the unillustrated external system are input to the server device 130, correlated with the surgery-related video file, and accumulated together with the video file into the server device 130.

As is clear from comparison between FIGS. 5 and 6, ratio of areas occupied by the synchronous display area DA1 and the supplementary display area DA2 in the display area of the viewing terminal device 140 is different between the mode of divisional display in the main screen and the sub-screens, and the equally quartered mode, proving that the synchronous display area DA1 becoming narrower and the supplementary display area DA2 becoming wider, in the latter mode rather than in the former mode.

When pointing on the editor switching icon 1429, the supplementary display area DA2 presents information regarding editing of the video being displayed in the synchronous display area DA1, and operational icons for the editing.

Contents of display in the supplementary display area DA2 and operation regarding the editing in this case will be detailed later, so that the description here will be skipped.

The timeline display area DA3 is a display area that displays a timeline, which presents time slots on the time code corresponded to a video file being displayed in the synchronous display area DA1. In more detail, the timeline display area DA3 presents the timelines corresponded to the plurality of video files, independently for the individual input systems (cameras 111 to 114).

Now the timeline is a linear or band-like presentation that teaches in which time slot the video file is recorded, or, in which time slot the video file is not recorded.

The timeline presented in the timeline display area DA3 is preferably presented on the basis of a referential time code corresponded to the video file relevant to the timeline. The individual timelines preferably have different style presentation (using different colors, for example) which are identifiable from each other.

Besides the timelines, the timeline display area DA3 also presents a cursor 1414 overlaid on the timelines, which indicates a time point of the synchronous display in the synchronous display area DA1 (see FIG. 10).

The cursor 1414 in this embodiment is composed of a window in which the time point (both of time and elapsed time from the start of recording), and a linear bar laid across the plurality of input systems.

The cursor 1414 not only teaches the time point of the synchronous display which proceeds in the synchronous display area DA, but also has a function of providing synchronous display of the video file in the synchronous display area DA1, at a time point freely selected by a user's operation such as lateral sliding along the time axis.

The timeline presented in the timeline display area DA3 has tags presented on the upper side and lower side thereof.

The tag presented on the upper side of the timeline is used for indicating, on the timeline, time (time code) corresponded to the event information that is displayed when the "Event" tab is selected in the supplementary display area DA2. For example, a tag 1413 in FIG. 10 is given on the upper side of the timeline relevant to the camera 111 (the time line headed by "Video. 1"), which is corresponded to an event information 1412 titled "16:50:15 Surgery start" shown in FIG. 7.

Meanwhile, the tag presented on the lower side of the timeline is used for indicating time (time code) corresponded to the comment information that is displayed when the "Comment" tab is selected in the supplementary display area DA2. For example, a tag 1415 in FIG. 10 is given on the lower side of the timeline relevant to the camera 111, which is corresponded to a comment information 1407 titled "17:04:08 Conference 1" shown in FIG. 8 and to a still image 1404 shot at the same time point (captured by capturing process described later).

Note that the tags, illustrated in the individual drawings of this embodiment so as to be given only to the timeline headed by "Video. 1" (timeline relevant to the camera 111), may alternatively be given to other timelines (the timelines relevant to the cameras 112 to 114).

The tags are given to the target timeline, as a result of processing by the server device 130.

Upon being triggered by an operational input by the user made on the viewing terminal device 140 (more specifically, pointing on a capture icon 1426 described later), the server device 130 executes a process of attaching the tag on the lower side of the timeline (referred to as first tagging, hereinafter), corresponding to a time code at a certain time point contained in the timeline given in the timeline display area DA3.

The server device 130 also executes a process of attaching the tag on the upper side of the timeline (referred to as second tagging, hereinafter), corresponding to a time code at a certain time point contained in the timeline given in the timeline display area DA3, on the basis of the event information and the temporal information received from the unillustrated external system.

For both of the tags attached on the upper side and lower side of the timeline, the user can change the time point at which the synchronous display proceeds in the synchronous display area DA1, to time (time code) corresponded to a designated tag, by pointing with the pointer 1401. In this process, also position of the cursor 1414 moves to a position corresponded to such time.

For both of the tags attached on the upper side and lower side of the timeline, upon coincidence between the time (time code) indicated by the tag and time indicated by the cursor 1414 (the time point at which the synchronous display proceeds in the synchronous display area DA1), the event information or comment information corresponded to the time is displayed so as to be overlaid on the display area of the video file from the input system corresponded to such tagged timeline.

With the pointer 1401 overlaid on the main screen during the divisional display in the main screen and the sub-screens, a full screen display icon 1402 appears at the center of the main screen, an input system indicator 1403 that indicates an input system corresponded to the video currently played back on the main screen appears at the right top corner of the main screen, and still images (captured by capturing described later) captured from the video file currently played back on the main screen are shown below the main screen (see FIG. 7).

Now pointing on the full screen display icon 1402 with the pointer 1401 activates full screen display (not illustrated) of the video currently played back on the main screen.

At this point in time, with the pointer 1401 overlaid on the still image (the still image 1404, for example) shown below the main screen, a comment edit icon 1405 and a delete icon 1406 appear in the display area of the still image 1404. Also a comment information 1408, which is same as the comment information 1407 corresponded to the still image 1404, appears on the main screen (see FIG. 8).

Pointing on the comment edit icon 1405 with the pointer 1401 enables editing of the comment information 1407 (modification of previously entered comment information) corresponded to the target still image 1404.

Pointing on the delete icon 1406 with the pointer 1401 enables deletion of the target still image 1404 and the comment information 1407 corresponded thereto, resulting in disappearance of them from the display area of the viewing terminal device 140.

With the pointer 1401 overlaid on the sub-screen during the divisional display on the main screen and the sub-screens, a full screen display icon 1409 and a display switching icon 1410 appear on the sub-screen, and an input system indicator 1411 that indicates an input system corresponded to the video currently played back on the sub-screen appears at the right top corner of the sub-screen (see FIG. 9).

Now pointing on the full screen display icon 1409 with the pointer 1401 activates full screen display (not illustrated) of the video currently played back on the sub-screen.

Also at this point in time, pointing on the display switching icon 1410 with the pointer 1401 activates switching between the video currently played back on the sub-screen and the video currently played back on the main screen (not illustrated).

The timeline display area DA3 has playback speed select icons 1416 arranged in the left bottom part (see FIG. 10).

The playback speed select icons 1416 are operational icons used for selecting playback speed of the video currently under synchronous display in the synchronous display area DA1.

In more detail, the playback speed select icons 1416 are operational icons enabling choices among "0.5× speed", "1× speed", "1.5× speed", "2× speed", "4× speed", "6× speed" and "8× speed", which are arranged in this order from the left in FIG. 10.

Note that the choices of playback speed enumerated above are merely illustrative, and may suitably be altered when carrying out the present invention.

The timeline display area DA3 has operational icons used for controlling playback, arranged at the bottom center (see FIG. 11).

A jump-to-top icon 1417 is an operational icon used for making the cursor 1414 jump from the current display position (time point synchronously displayed in the synchronous display area DA1), to the display position of the nearest "comment" tag on the preceding side of the current display position.

A 30-second-back skip icon 1418 is an operational icon used for changing the current time point synchronously displayed in the synchronous display area DA1 to a 30-second-earlier time point.

A 10-second-back skip icon 1419 is an operational icon used for changing the current time point synchronously displayed in the synchronous display area DA1 to a 10-second-earlier time point.

A playback icon 1420 is an operational icon used for starting playback of the video file in the synchronous display area DA1.

A stop icon 1421 is an operational icon used for stopping playback of the video file in the synchronous display area DA1.

A 10-second skip icon 1422 is an operational icon used for changing the current time point synchronously displayed in the synchronous display area DA1 to a 10-second-later time point.

A 30-second skip icon 1423 is an operational icon used for changing the current time point synchronously displayed in the synchronous display area DA1 to a 30-second-later time point.

A jump-to-end icon 1424 is an operational icon used for making the cursor 1414 jump from the current display position (time point synchronously displayed in the synchronous display area DA1), to the display position of the nearest "comment" tag on the succeeding side of the current display position.

Note that the above enumerated operational icons for controlling playback are only illustrative, instead allowing provision of any operational icons for playback control other than those enumerated above, or omission of at least a part of the above enumerated operational icons for playback control.

Also functions of the above enumerated operational icons for controlling playback are only illustrative, instead allowing that the operational icons provided in a similar display mode may represent other functions when carrying out this invention. For example, the jump-to-top icon 1417 or the jump-to-end icon 1424 may be used for making the cursor 1414 jump from the current display position (time point synchronously displayed in the synchronous display area DA1), to the display position of the nearest "event" tag on the preceding side or the succeeding side of the current display position.

The timeline display area DA3 has operational icons below, arranged in the right bottom part (see FIG. 12).

In the division mode select area 1425, pointing on the left icon divides the synchronous display area DA1 into the main screen and the sub-screens (see FIG. 5), meanwhile pointing on the right icon quarters the synchronous display area DA1 (see FIG. 6).

Time axis select icons 1427 are buttons that accept operation of widening or narrowing the width of display of unit time (one minute, in this embodiment) on the time axis (abscissa) in the timeline display area DA3. In more detail, the time axis select icons 1427 are operational icons including an operational icon used for maximizing the width of display of unit time on the time axis in the timeline display area DA3, an operational icon used for widening the width of display by one step, an operational icon used for narrowing the width of display by one step, and an operational icon used for minimizing the width of display, which are arranged in this order from the left in FIG. 12.

A capture icon 1426 is a button through which an operation that triggers capturing is accepted. Now the capturing is a process for clipping an image contained in the video file currently displayed on the synchronous display area DA1 (more specifically, an image being displayed when the capture icon 1426 is pointed), as a still image.

When executing the capturing, the server device 130 not only executes a process of attaching a tag to the lower side of the timeline correlated with the time code corresponded to the image (first tagging), but also displays a comment entry field (not illustrated) into which a freely selected comment information may be entered, and stores the comment information entered in the comment entry field, while correlating it with the image and the time code indicated by the tag.

<Editing of Video File to be Synchronously Displayed>

Next, editing of the video file synchronously displayed in the synchronous display area DA1 will be explained referring to FIGS. 13, 14A and 14B.

Figure 13:
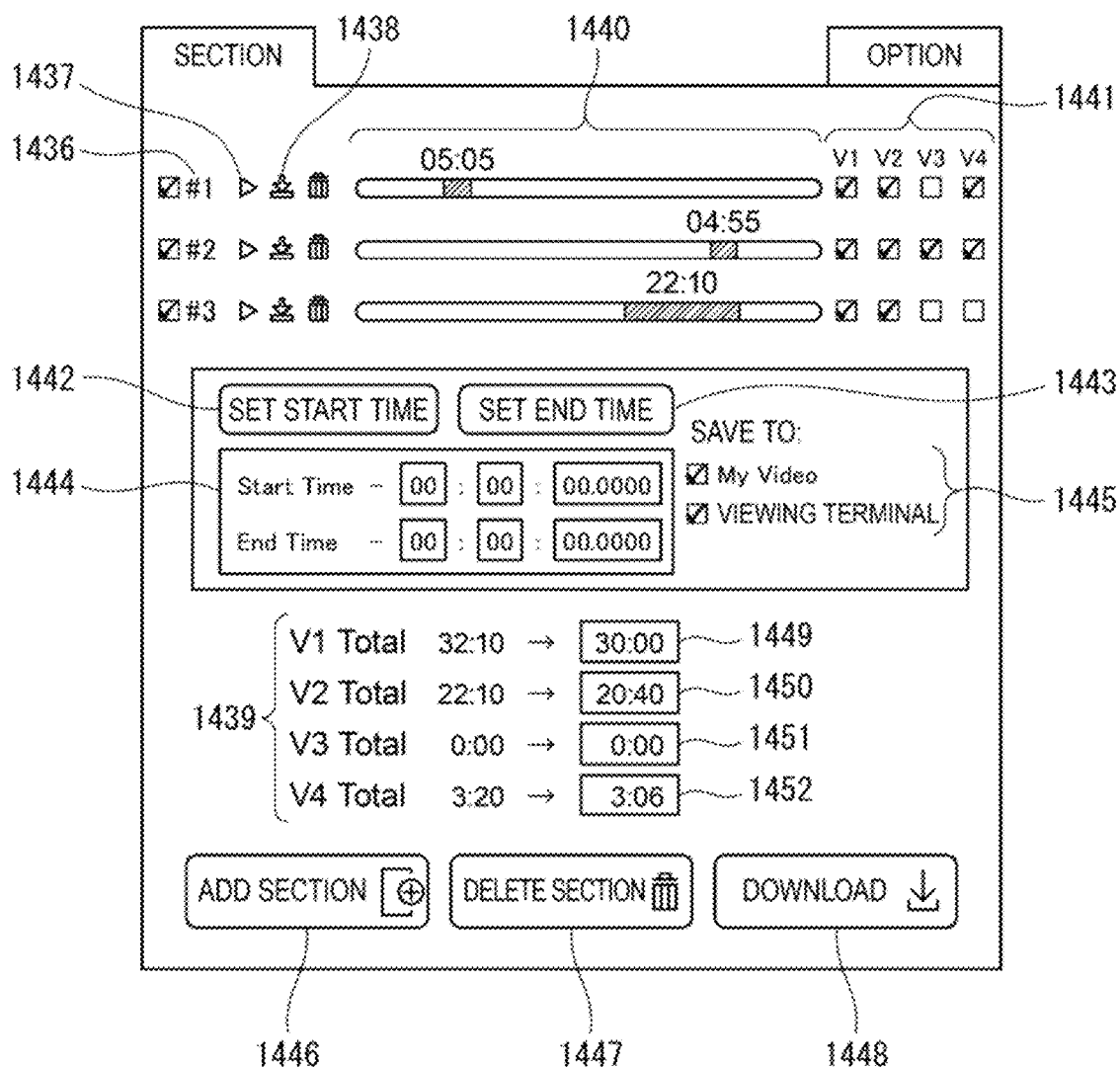
FIG. 13 is a drawing illustrating a specific example of a part of display in a supplementary display area when an editor switching icon is pointed.

FIG. 13 is a drawing illustrating a specific example of a part of display in the supplementary display area DA2 when the editor switching icon 1429 is pointed. FIGS. 14A and 14B are a schematic drawing regarding a process for integrating the video files to be stored.

With the editor switching icon 1429 pointed, "Section" tab in the supplementary display area DA2 shows contents below (see FIG. 13).

A section indication area 1440 presents a section that is set previously on the basis of operation made on an operational icon such as a section addition icon 1446 described later. Now the section means a part of or the whole of the time slot on the time code corresponded to the video currently displayed in the synchronous display area DA1. A specific method for setting the section will be described in conjunction with the section addition icon 1446 and other operational icons, so that the description here will be skipped.

In the example illustrated in FIG. 13, the section indication area 1440 presents all recorded time slots with blank timelines, wherein hatched bars indicate to which time slots among from the whole time slots, the individual preset sections belong. Now the "recorded whole time slots" means combined time slots shot by at least one of the cameras 111 to 114 during the surgical period. Since the video file input from the camera 111 in this embodiment is recorded throughout the surgical period, so that the time slot represented by the timeline regarding such video file (the time line headed by "Video. 1" in FIG. 5, etc.) is equal to the "Recorded Whole Time Slot". That is, the blank part of the timeline in the section indication area 1440S represents the length of time, equivalent to the recording time of the video file headed by "Video. 1" displayed in the synchronous display area DA1.

Input system designation boxes 1441 are check boxes provided to enable free designation of a part of or the whole of a plurality of input systems corresponded to the video file currently displayed in the synchronous display area DA1, upon operation made by the user. That is, the input system designation boxes 1441 compose the input system designation unit in the context of the present invention.

In more detail, for each of the sections (hatched time slots) presented on the section indication area 1440, the input system designation boxes 1441 enable designation of the input system (cameras 111 to 114) to be targeted at the section. For example, when checking the check boxes identified by "V1", "V2", "V3" and "V4", the video files respectively input from the camera 111, camera 112, camera 113 and camera 114 will be targeted at. Each check box may be checked or unchecked by the user at will, through pointing with the pointer 1401.

Note that although all input system designation boxes 1441 in this embodiment are made designatable for each section, even if some check box were corresponded to the input system having no video file (for example, the input system identified by "V3") as described later (as illustrated in FIG. 13), such check box may alternatively be banned from checking, so as to prohibit unnecessary designation.

Section number indicators 1436 are check boxes provided so as to allow free designation, upon operation made by the user, of one or a plurality of sections (that is, the sections indicated in the section indication area 1440) set while being triggered by pointing on a later-described section addition icon 1446. That is, the section number indicators 1436 compose the section designation unit in the context of the present invention.

In more detail, the section number indicators 1436 contain identification numbers of the sections (for example, those given by "#1" to "#3"), and the check boxes used for designating the sections. The check boxes contained in the section number indicators 1436 are used for operations in response to pointing on a section delete icon 1447 and a download icon 1448 described later.

The individual download icon 1438 is an operational icon that accepts an operation of storing the video file corresponded to the time code contained in the section (that is, the video file in the hatched time slot, among from the timelines presented in the section indication area 1440), to a designated destination (storage area designated by a save location check box 1445 described later). The video file stored upon pointing on the individual download icon 1438 is corresponded to the section currently presented in the section indication area 1440, and, is the video file from the input system designated with the input system designation boxes 1441.

An individual playback icon 1437 is an operational icon that accepts an operation for synchronously displaying the video file corresponded to the time code contained in the section, in the synchronous display area DA1. The video file synchronously displayed upon pointing on the individual playback icon 1437 is corresponded to the section currently presented in the section indication area 1440, and, is the video file from the input system designated with the input system designation boxes 1441.

A saved video time indicator 1439 indicates the length of time of section overlap. In more detail, the saved video time indicator 1439 indicates the length of time of section overlap for the individual input systems.

Assuming now a case where a plurality of video files corresponded to at least a part of the preset sections (more specifically, sections designated by the section number indicators 1436) are read out from the server device 130, the section overlap means the time slot that overlaps the section, among from one or a plurality of time slots over which the read video files are recorded. Note, since a process per se for calculating the length of time of section overlap is executed by the server device 130, so that the calculation unit in the present invention is embodied by the server device 130.

Referring now to the example illustrated in FIG. 13, since the check boxes corresponded to sections "#1" to "#3" under "V1" among from the input system designation boxes 1441 have been checked, so that "V1 Total" in the saved video time indicator 1439 presents the length of time of section overlap regarding the designated three sections (32 minutes and 10 seconds (32:10)). Since the input system assigned to "V1" (input from the camera 111) is fully engaged in recording throughout the whole time slots of the surgical period, so that the length of time of section overlap presented following "V1 Total" in the saved video time indicator 1439 coincides with the total time of sections "#1" to "#3".

Referring next to "V2" in the input system designation boxes 1441, like "V1", the check boxes corresponded to sections "#1" to "#3" have been checked, so that "V2 Total" in the saved video time indicator 1439 presents the length of time of section overlap regarding the designated three sections section (22 minutes and 10 seconds (22:10)). Since the input system assigned to "V2" (input from the camera 112) is engaged in recording in which the time slot over which the video files are recorded are distributed over the surgical period, so that the length of time of section overlap presented following "V2 Total" in the saved video time indicator 1439 is shorter than the total time of sections "#1" to "#3".

Next, since the check box corresponded to section under "#2" has been checked under "V3" among from the input system designation boxes 1441, and the check boxes corresponded to sections "#1" and "#2" under "V4" among from the input system designation boxes 1441 have been checked, so that "V3 Total" and "V4 Total" in the saved video time indicator 1439 present the lengths of time of section overlap regarding the sections designated for each of them (0 minutes and 0 seconds (0:00) and 3 minutes and 20 seconds (3:20)). Note that the input system assigned to "V3" (input from the camera 113) has no video file corresponded to section under "#2" (video is not recorded in this section), so that the length of time of section overlap presented following "V3 Total" in the saved video time indicator 1439 is given as 0 minutes and 0 seconds (0:00).

Note as illustrated in FIG. 13, the time slots in sections "#2" and "#3" partially overlap. In this case, the length of time presented in the saved video time indicator 1439 (length of time calculated by the calculation unit) in this embodiment is defined without taking the mutually overlapped time slot into account, while handling both sections as independent sections. This will be detailed later.

On the right side of the length of time of section overlap regarding the individual input systems presented in the saved video time indicator 1439, provided are shortening goal time indicators 1449 to 1452 for indicating predetermined lengths of time which are the goals of later-described shortening process executed upon clip storage, for the individual input systems.

The shortening goal time indicators 1449 to 1452 will be detailed later.

A start/stop entry field 1444 is an indication field allowed for input of start time and end time of a section wished to be added. The start/stop entry field 1444 has, from the left to right, entry fields for numerals in "hours", entry fields for numerals in "minutes", and entry fields for numerals in "seconds". The individual fields in the start/stop entry field 1444 allow the user to enter freely selected numerals, on the basis of operational input by the user made on an unillustrated operational unit (keyboard, for example).

A start time setting icon (Set Start Time) 1442 is an operational icon that accepts an operation of entering the display position of the cursor 1414 (time point under synchronous display in the synchronous display area DA1), into the field of start time in the start/stop entry field 1444.

An end time setting icon (Set End Time) 1443 is an operational icon that accepts an operation of entering the display position of the cursor 1414 (time point under synchronous display in the synchronous display area DA1), into the field of end time in the start/stop entry field 1444.

Save location check boxes 1445 are check boxes designating the destination storage area, in download processes activated upon pointing on the individual download icon 1438 and the download icon 1448. Note that, a storage area named "My Video" in FIG. 13 means a storage area in the server device 130, which is allowed for the logged-in user at this point in time, and the "viewing terminal" means a storage area provided in the viewing terminal device 140 which is viewed by the user at this point in time.

The section addition icon (Add Section) 1446 is an operational icon that accepts an operation of adding a section to be presented in the section indication area 1440, according to the start point and the end point having been entered at this point in time in the start/stop entry field 1444.

Upon pointing on the individual operational icons enumerated above, the user can freely set the section. That is, the aforementioned operational icons accept operations that trigger the section setting unit of the present invention. Note since a process per se for setting the section is executed by the server device 130, so that the section setting unit in the present invention is constructed by the server device 130.

The section delete icon (Delete Section) 1447 is an operational icon that accepts an operation of deleting the section whose check box in the section number indicators 1436 has been checked at this point in time (deleting from a list presented in the section indication area 1440).

The download icon (Download) 1448 is an operational icon that accepts an operation that triggers a process of partially clipping the video file corresponded to the time code contained in the section overlap presented in the saved video time indicator 1439 (determined as a target of calculation by the calculation unit), and storing it in the predetermined storage area (referred to as clip storage process, hereinafter). That is, the download icon 1448 accepts an operation that triggers the clip storage unit in the present invention.

In more detail, the download icon 1448 is an operational icon that accepts an operation of collectively storing the video files, which correspond to the sections whose check boxes in the section number indicators 1436 are checked at this point in time, and, which are input from the input systems designated with the input system designation boxes 1441 for the individual sections, into a predetermined storage area designated by the save location check boxes 1445. In other words, the clip storage process triggered by pointing on the download icon 1448 can collectively store the video files, which correspond to the time codes contained in the sections designated with the section number indicators 1436, and are input from the input systems designated by the input system designation boxes 1441.

Note that the aforementioned clip storage is executed by the server device 130 that stores a target video file into a predetermined storage area, in response to a request based on pointing on the download icon 1448 accepted on the viewing terminal device 140.

Now in a case where "My Video" is designated as the predetermined storage area, the clip storage process is understood as a process by which an original video file, from which the video file currently displayed in the synchronous display area DA1 of the viewing terminal device 140 is derived, is read out from the storage area (storage area in the server device 130), the original video file is then partially duplicated to obtain a new video file, and the new video file is stored in other storage area in the server device 130.

Alternatively, in a case where "Viewing terminal" is designated as the predetermined storage area, the clip storage process is understood as a process by which an original video file, from which the video file currently displayed in the synchronous display area DA1 of the viewing terminal device 140 is derived, is read out from the storage area (storage area in the server device 130), the original video file is then partially duplicated to obtain a new video file, the new video file is then transferred from the server device 130 to the viewing terminal device 140, and the viewing terminal device 140 stores the new file in its own storage area.

That is, the clip storage unit in the present invention is understood to be constructed cooperatively by the server device 130 and the viewing terminal device 140.

In at least a part of cases where the length of time (length of time of section overlap calculated by the calculation unit) presented in the saved video time indicator 1439 exceeds a predetermined length of time (30 minutes, for example), the server device 130 carries out the clip storage process, which causes a shortening process that shortens the video file to be stored in the predetermined storage area, to a predetermined length of time or shorter.

The length of time of the shortened video file, which may only be within the predetermined length of time, is more preferably almost equal to the predetermined length of time, taking the object of the present invention into account.

The predetermined length of time, assumed to be a goal for the shortening process, is presented in each of the shortening goal time indicators 1449 to 1552 for every input system. That is, a predetermined length of time of the input system assigned to "V1" is presented in the shortening goal time indicator 1449, a predetermined length of time of the input system assigned to "V2" is presented in the shortening goal time indicator 1450, a predetermined length of time of the input system assigned to "V3" is presented in the shortening goal time indicator 1451, and a predetermined length of time of the input system assigned to "V4" is presented in the shortening goal time indicator 1452.

The shortening goal time indicators 1449 to 1552 are designed so that entry of a predetermined length of time into any one of them will cause automatic entry of the predetermined lengths of time into the other three indicators, according to a nearly equal ratio of shortening over all input systems. Now "according to a nearly equal ratio of shortening over all input system" specifically means that all of ratio of display time of "V1 Total" and display time presented in the shortening goal time indicator 1449, ratio of display time of "V2 Total" and display time presented in the shortening goal time indicator 1450, ratio of display time of "V3 Total" and display time presented in the shortening goal time indicator 1451, and ratio of display time of "V4 Total" and display time presented in the shortening goal time indicator 1452 are nearly equal.

The predetermined lengths of time presented in the shortening goal time indicators 1449 to 1552, although more preferably being lengths of time freely determinable through operation made by the user considering the object of the present invention, may alternatively be lengths of time that are automatically set on occasions. For example, the predetermined length of time may be automatically set to a default value at the beginning, and then may be readjusted later as necessary through operation made by the user.

In a case where there are a plurality of video files corresponded to the time code contained in the section overlap to be presented in the saved video time indicator 1439 (having been subjected to calculation by the calculation unit), a positive correlation is preferably found between ratio of length of time occupied by each video file to be shortened by the shortening process relative to the length of time of the section overlap, and the length of time of each video file shortened by the shortening process. More strictly, each video file is preferably shortened nearly proportionally to the ratio of length of time occupied by each video file to be shortened by the shortening process, relative to the total length of time.

Referring now to an exemplary case illustrated in FIG. 13, shortening of the length of time of section overlap presented in "V1 Total" in the saved video time indicator 1439 (32:10) down to a goal of predetermined length of time (30:00) preferably involves section under "#1" shortened from "5:05" to approximately "4:44.5", section under "#2" shortened from "4:55" to approximately "4:35.1", and section under "#3" shortened from "22:10" to approximately "20:40.4", which results in shortening to a total length of 30 minutes. One possible way to accomplish such shortening process is, for example, to make the server device 130 delete (thin) an equal number per unit time of image frames, from the video file to be shortened. Such mode of shortening process is however a mere example, so that the mode of shortening process when carrying out the present invention is not limited thereto.

The video file, thus clip-stored by the aforementioned shortening process, is recognized at a fast playback speed (as if it is fast-forwarded) when played back on the viewing terminal device 140 even at 1 speed.

According to the clip storage process triggered by pointing on the download icon 1448 in this embodiment, in a case where there are a plurality of video files corresponded to the time code contained in the section overlap currently presented in the saved video time indicator 1439 (determined to be a target for calculation by the calculation unit), the server device 130 can integrate at least a part of the plurality of video files to be stored, and can store them in the predetermined storage area.

Now an explanation will be made on an exemplary case where the video file corresponded to section overlap (22:10) under "V2 Total" in the saved video time indicator 1439 is subjected to the clip storage process. In this case, as illustrated in FIG. 13, there are three sections designated for the input system under "V2" in the input system designation boxes 1411 (section S1 under "#1", section S2 under "#2", and section S3 under "#3"), and three video files (video file F1, video file F2 and video file F3) are corresponded to such three sections (see FIG. 14A).

Now, section overlap P1 between section S1 and video file F1 contain the time code in a time slot ranging from 00:17:00 to 00:22:05, same as section S1. Section overlap P2 between section S2 and video file F3 contain the time code in a time slot ranging from 01:08:45 to 01:13:40, same as section S2. Section overlap P3 between section S3 and video file F2 contain the time code in a time slot ranging from 01:08:45 to 01:13:40. Section overlap P4 between section S3 and video file F3 contains the time code in a time slot ranging from 01:05:00 to 01:14:10.

Hence, a target of the clip storage process in this case involves the video files corresponded to the time codes contained in section overlaps P1 to P4. The individual video files are then integrated into a single video file F4, where the order of combination of section overlaps P1 to P4 in the video file F4 is determined to follow an ascending order of identification numbers of the corresponding sections ("#1"→"#2"→"#3"), and section overlap P3 and section overlap P4 assigned to the same identification number are combined so that the former with the earlier time code precedes, and the latter follows (see FIG. 14B).

The aforementioned case where a plurality of video files are to be stored by the clip storage process will be explained below, enumerating specific examples.

The first specific example relates to a case where a plurality of video file are to be subjected to the clip storage process, with a single section designated in the section number indicators 1436, and also with a single input system designated with the input system designation boxes 1441.

Typically as represented by a part of timelines displayed in the timeline display area DA3 for example in FIG. 5 (timelines corresponded to the cameras 112 to 114), when the sections are designated for the input system having the video files distributed over separate time slots (recorded time slots and interrupted time slots are mixed), the number of video files to be stored by the clip storage process could be two or more, even if only one section and only one input system has been designated.

When executing the clip storage process in this case, the server device 130 may integrate the plurality of video files to be stored.

The second specific example relates to a case where a plurality of video file are to be subjected to the clip storage process, with a plurality of sections designated in the section number indicators 1436, and with a single input system designated by the input system designation boxes 1441. The explanation above making reference to FIGS. 14A and 14B apply to this case.

Typically as represented by a part of timelines displayed in the timeline display area DA3 for example in FIG. 5 (timelines corresponded to the camera 111), when the sections are designated for the input system having a single video file over the whole time slots (recorded over the whole time slots), the designated plurality of sections are handled as independent ones even if only one input system has been designated, so that also the video files to be subjected to the clip storage process are handled as the multiple ones.

When executing the clip storage process also in this case, the server device 130 may integrate the plurality of video files to be stored.

Meanwhile, there may be a case (referred to as the third case, hereinafter) where integration of a plurality of video files is not recommendable, even if there appears to be a plurality of video files to be stored, among from the video files corresponded to the time code contained in the section designated in the section number indicators 1436.

In an exemplary case where the plurality of video files to be stored, among from the video files corresponded to the time code contained in one or a plurality of sections designated in the section number indicators 1436, are those input from the camera 111 and those input from the camera 112 (that is, with one or a plurality of sections designated in the section number indicators 1436, and with a plurality of input systems designated by the input system designation boxes 1441), categories of the video contents are different for each input system (the video from the camera 111 presents a surgical field, and the video from the camera 112 presents changes of vital information), so that integration into a single video file is not always suitable from the viewpoint of management or from the best use of archive. Hence, the server device 130 does not necessarily integrate the video files when carrying out the clip storage process in such case.

Meanwhile, in a case where a priority is placed on reducing the number of the video files to be stored in a predetermined storage area, the server device 130 may alternatively be allowed to integrate the plurality of video files to be stored.

In such case, whether the video files to be stored are integrated or not may alternatively be a matter of free choice by the user.

Even in the third specific case, if there were a plurality of video files to be stored in at least one of the input systems, the clip storage process is preferably designed to enable integration of the plurality of video files to be stored into a single video file for every input system, followed by storage into a predetermined storage area. This is because the videos from the same input system belong to the same category, so that the integration will not pose a problem against management or best use of archive.

Since the clip storage process is thus executed to integrate the individual video files corresponded to a plurality of sections into a single file for every input system, so that the number of video files to be managed is reduced, expectedly reducing the workload for management by the user.

It is obviously natural that the aforementioned integration of a plurality of video files is equally applicable both to the video files having been shortened, and the video files not having been shortened.

The user of the medical video processing system 100 can utilize the aforementioned clip storage process, can easily obtain a new video file composed of extracted video clips recorded within desired time slots, can make best use thereof typically for preparation of presentation materials for conference presentation, and can easily manage it.

Modified Examples of Present Invention

Having described the present invention on the basis of the embodiment referring to the individual drawings, the present invention is not limited to the aforementioned embodiment, instead allowing various modifications and improvements so long as the object of the present invention will be achieved.

Although the aforementioned explanation has been made presupposing the constituents illustrated in FIG. 1, the individual constituents of the present invention may only be formed so as to embody the functions thereof. Hence, the individual constituents of the present invention are not always necessarily be independent from each other, encompassing that a plurality of constituents are formed as a single member, that a single constituent is composed of a plurality of members, that a certain constituent is a part of other constituent, and that a part of a certain constituents overlaps a part of other constituent.

For example, the medical video processing system does not necessarily include a recording device equivalent to the cameras 111 to 114, and may process video files input from an external recording device, or may process video files input from a device other than the recording device (medical measuring instrument, for example).

The various operations described in the aforementioned embodiment are merely specific examples, to which working of the present invention is by no means limited. Hence, each of the aforementioned operations may be replaced by other operation, may be partially omissible, or may allow addition of other operation having not been explained in the embodiment.

The various modes of display described in the aforementioned embodiment are merely specific examples, to which working of the present invention is by no means limited. Hence, each of the aforementioned displays may be replaced by other display, may be partially omissible, or may allow addition of other display having not been explained in the embodiment.

The various editing processes described in the aforementioned embodiment are merely specific examples, to which working of the present invention is by no means limited. Hence, each of the aforementioned editing processes may be partially omissible, or may allow addition of other editing process having not been explained in the embodiment.

The aforementioned embodiment has described that the video file input from the camera 111 is recorded throughout the surgical period, and, that the timeline regarding the video file (the timeline headed by "Video. 1" in FIG. 5, etc.) is equivalent to the period over which the surgery takes place, to which the present invention is by no means limited. That is, when carrying out the present invention, the video file that is recorded throughout the surgical period does not always necessarily exist, instead allowing that all video files, to be displayed synchronously in the viewing terminal device 140 (synchronous display area DA1), contain time slots in which recording is interrupted.

Although the aforementioned explanation has been made presupposing the structure in which the video files are input from a plurality of input systems, the present invention may alternatively be carried out in a medical video processing system having only a single input system, or, not allowed for synchronous display. In this case, there may be no structure equivalent to the input system designation unit (input system designation boxes 1441) in the context of the present invention.

Although the aforementioned explanation has been made presupposing the structure in which preset (presented in the section indication area 1440) one or a plurality of sections are freely designated upon operation made by the user, it is not always necessary to provide a structure that can designate the section later, that is, a structure equivalent to the section designation unit (check boxes of the section number indicators 1436) in the present invention.

The aforementioned explanation has been made that the calculation unit in the present invention processes the sections having an overlapped time slot (for example, section under "#2" and section under "#3" illustrated in FIG. 13) are handled as independent sections, and the length of time (length of time calculated by the calculation unit) presented in the saved video time indicator 1439 does not take the mutually overlapped time slot into account. Working of the present invention is however not limited thereto.

In an exemplary case where a part of or the whole of a plurality of sections designated with the section number indicators 1436 overlap, and where the clip storage process is designed to handle a time slot, having integrated therein a first section and a second section, as an independent section [referring for example to a case illustrated in FIGS. 14A and 14B, in a case where the clip storage process is directed to video files corresponded to the time code contained in section S2 (from 01:08:45 to 01:13:40) and section S3 (from 00:52:00 to 01:14:10), or, an independent section obtained by integrating a plurality of sections (from 00:52:00 to 01:14:10)], the display time in the saved video time indicator 1439 is preferably a length of time of section overlap determined on the basis of such independent section. This is because such total time is equal to the length of time the video is actually played back.

The aforementioned embodiment has described that, in a case where the video files to be subjected to the clip storage process are distributed over a plurality of input systems, the clip storage process triggered by an operation made on the download icon 144 is preferably carried out, while applying the shortening process to each of the input systems. Working of the present invention is however not limited thereto.

For example, in the aforementioned case, it is acceptable to add up the length of time of all video files corresponded to the time code of the section overlap across the plurality of input systems, and to carry out the shortening process that shortens the thus obtained total time down to a goal of predetermined length of time or shorter.

Positions of presentation of individual operational icons explained in the aforementioned embodiment are merely illustrative, to which the present invention is not limited. Note however that the operational icons used for the editing process in the present invention are preferably presented where they can be operated while viewing the timeline display area and the synchronous display area. In other words, the operational icons used for the editing process in the present invention are preferably presented on the display unit in the present invention, on which the timeline display area and the synchronous display area are presented. Now the concept expressed by " . . . presented on the display unit . . . on which the timeline display area and the synchronous display area are presented" encompasses not only a case where they are presented in the same display frame (window), but also a case where they are presented in separate display frames as in the aforementioned embodiment (see FIGS. 13, 14A and 14B), and again also a case where they are presented on a plurality of display devices (multi-monitor) under control of the same platform.

This embodiment encompasses technical spirits below.

(1) A medical video processing system comprising:

a storage unit that stores multiple video files recorded over a part of or the whole of a surgical period during which a surgery takes place, corresponding to a time code determined while assuming a certain time point in the surgical period as a start point;

a display unit that displays the video files stored in the storage unit and information regarding the video files;

a section setting unit that freely sets, upon operation made by a user, a section which is a part of or the whole of a time slot on the time code corresponded to the video files that are displayed on the display unit;

a calculation unit that reads one or multiple video files that correspond to at least a part of the section set by the section setting unit out from the storage unit, and calculates a length of time of a section overlap which represents a time slot that overlaps the section, among from one or multiple time slots over which the read video file(s) are recorded; and a clip storage unit that partially clips the video file(s) that corresponds to the time code contained in the section overlap having been subjected to calculation by the calculation unit, and stores the video file(s) in a predetermined storage area, the clip storage unit being devised, in at least a part of cases where the length of time of the section overlap calculated by the calculation unit exceeds a predetermined length of time, to carry out a shortening process that shortens the length of time of the video file(s) to be stored in the predetermined storage area, down to a predetermined length of time or shorter.

(2) The medical video processing system according to (1), wherein the predetermined length of time is a length of time freely determinable through an operation by the user.
(3) The medical video processing system according to (1) or (2), wherein in a case where there were multiple video files corresponded to the time code contained in the section overlap having been subjected to calculation by the calculation unit, the clip storage unit applies a positive correlation between ratio of length of time occupied by each video file to be subjected to the shortening process relative to the length of time of the section overlap, and the length of time of each video file shortened by the shortening process.
(4) The medical video processing system according to any one of (1) to (3), wherein in a case where there were multiple video files corresponded to the time code contained in the section overlap having been subjected to calculation by the calculation unit, the clip storage unit integrates at least a part of the plurality of video files to be stored, and stores them in the predetermined storage area.
(5) The medical video processing system according to (4), further including a video input unit that inputs the plurality of video files regarding the surgery through multiple input systems, and in a case where the video files corresponded to the time code contained in the section overlap having been subjected to calculation by the calculation unit have been input through the plurality of input systems, and where multiple video files to be stored were assigned to at least one of the input systems, the clip storage unit integrates the plurality of video files to be stored into a single video file for every input system, and stores the single video file in the predetermined storage area.
(6) The medical video processing system according to (5), further including:

a section designation unit that freely designates, upon operation made by an user, one or multiple sections set by the section setting unit; and an input system designation unit that freely designates, upon operation made by a user, a part of or the whole of the plurality of input systems, wherein the clip storage unit collectively stores the video files having been corresponded to the time code contained in the section designated by the section designation unit, and having been input from the input system designated by the input system designation unit.

This application claims priority to Japanese Patent Application No. 2018-073877 filed on Apr. 6, 2018, the entire contents of which are incorporated by reference herein.

REFERENCE SIGNS LIST 100 medical video processing system
111 to 114 camera
120 encoder
130 server device
140 viewing terminal device
1201 input screen
1202 output screen
1203 status indication
1204 recording start button
1205 recording stop button
1206 still image shoot button
1207 recording pause button
1208 operation information indicator
1209 output information indicator
1210 display extension ON button
1211 sub-screen
1212 sub-screen
1213 sub-screen
1214 display extension OFF button
1401 pointer
1402, 1409 full screen display icon
1403, 1411 input system indication
1404 still image
1405 comment edit icon
1406 delete icon
1407, 1408 comment information
1410 display switching icon
1412 event information
1413 tag
1414 cursor
1415 tag
1416 playback speed select icon
1417 jump-to-top icon
1418 30-second-back skip icon
1419 10-second-back skip icon
1420 playback icon
1421 stop icon
1422 10-second skip icon
1423 30-second skip icon
1424 jump-to-end icon
1425 division mode select area
1426 capture icon
1427 time axis select icon
1428 viewer switching icon
1429 editor switching icon
1430 comment entry field
1431 save icon
1432 delete icon
1433 still image
1436 section number indicator
1437 individual playback icon
1438 individual download icon
1439 saved video time indicator
1440 section indication area
1441 input system designation box
1442 start time setting icon
1443 end time setting icon
1444 start/stop entry field
1445 save location check box
1446 section addition icon
1447 section delete icon
1448 download icon
1449 to 1452 shortening goal time indicator
DA1 synchronous display area
DA2 supplementary display area
DA3 timeline display area

The invention claimed is:

1. A medical video processing system comprising:
a storage unit that stores multiple video files recorded over a part of or the whole of a surgical period during which a surgery takes place, each of the video files comprising frames, each of the frames having a time code to define a sequential order of the frames to compose each of the video files;
a display unit that displays the video files stored in the storage unit and information regarding the video files;
a section setting unit that sets, upon operation made by a user, a section which is a part of or the whole of a time slot of each of the video files that are displayed on the display unit;
a calculation unit that reads at least one of the video files that correspond to at least a part of the section set by the section setting unit out from the storage unit, and calculates a length of time of a section overlap which represents a time slot that overlaps the section, among from one or multiple time slots over which the read video files are recorded; and a clip storage unit that partially clips the video files that corresponds to the time code contained in the section overlap having been subjected to calculation by the calculation unit, and stores the video files in a predetermined storage area, the clip storage unit for carrying out, in at least a part of cases where the length of time of the section overlap calculated by the calculation unit exceeds a predetermined length of time, a shortening process that shortens the length of time of the video files to be stored in the predetermined storage area, down to a predetermined length of time or shorter.

2. The medical video processing system according to claim 1, wherein the predetermined length of time is a length of time freely determinable through an operation by the user.

3. The medical video processing system according to claim 1, wherein in a case where there were multiple video files corresponded to the time code contained in the section overlap having been subjected to calculation by the calculation unit, the clip storage unit applies a positive correlation between ratio of length of time occupied by each of the video files to be subjected to the shortening process relative to the length of time of the section overlap, and the length of time of each video file shortened by the shortening process.

4. The medical video processing system according to claim 1, wherein in a case where there are multiple video files corresponded to the time code contained in the section overlap having been subjected to calculation by the calculation unit, the clip storage unit integrates at least a part of the multiple video files to be stored, and stores them in the predetermined storage area.

5. The medical video processing system according to claim 4, further comprising a video input unit that inputs the multiple video files regarding the surgery through multiple input systems, and in a case where the video files corresponded to the time code contained in the section overlap having been subjected to calculation by the calculation unit have been input through the multiple input systems, and where multiple video files to be stored were assigned to at least one of the input systems, the clip storage unit integrates the multiple video files to be stored into a single video file for every input system, and stores the single video file in the predetermined storage area.

6. The medical video processing system according to claim 5, further comprising:

a section designation unit that freely designates, upon operation made by a user, one or multiple sections set by the section setting unit; and an input system designation unit that freely designates, upon operation made by a user, a part of or the whole of the multiple input systems, wherein the clip storage unit collectively stores the video files having been corresponded to the time code contained in the section designated by the section designation unit, and having been input from the input system designated by the input system designation unit.

* * * * *